United States Patent
Li et al.

(10) Patent No.: US 10,686,504 B2
(45) Date of Patent: Jun. 16, 2020

(54) METHOD AND APPARATUS FOR USER EQUIPMENT BEAMFORMING OPERATION IN A WIRELESS COMMUNICATION SYSTEM

(71) Applicant: ASUSTek Computer Inc., Taipei (TW)

(72) Inventors: Ming-Che Li, Taipei (TW); Ko-Chiang Lin, Taipei (TW); Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 15/724,097

(22) Filed: Oct. 3, 2017

(65) Prior Publication Data

US 2018/0131425 A1  May 10, 2018

Related U.S. Application Data

(60) Provisional application No. 62/417,690, filed on Nov. 4, 2016.

(51) Int. Cl.
*H04J 3/00* (2006.01)
*H04B 7/06* (2006.01)
(Continued)

(52) U.S. Cl.
CPC ......... *H04B 7/0617* (2013.01); *H04B 7/0626* (2013.01); *H04B 7/0695* (2013.01);
(Continued)

(58) Field of Classification Search
None
See application file for complete search history.

(56) References Cited

U.S. PATENT DOCUMENTS 6,490,261 B1   12/2002  Dent et al.
9,167,597 B2 *  10/2015  Singh ............... H04W 56/0005
(Continued)

FOREIGN PATENT DOCUMENTS

EP          2824849       1/2015
WO       2014104800       7/2014
(Continued)

OTHER PUBLICATIONS

European Search Report from corresponding EP Application No. 17194482.0, dated Mar. 16, 2018.
(Continued)

*Primary Examiner* — Kwang B Yao
*Assistant Examiner* — Juvena W Loo
(74) *Attorney, Agent, or Firm* — Blue Capital Law Firm, P.C.

(57) ABSTRACT

Methods and apparatuses for user equipment beamforming operation in a wireless communication system. In one method, a user equipment receives a first configuration or a first scheduling to request the UE to perform a first Uplink (UL) transmission on a first UE beam, wherein the first UL transmission is to be performed in a first time unit. The UE receives a second configuration or a second scheduling to request the UE to perform a second UL transmission on a second UE beam, wherein the second UL transmission is to be performed in a second time unit. The UE performs the first UL transmission on the first UE beam and drops the second UL transmission on the second UE beam if the second time unit is at least partially overlapped with the first time unit.

20 Claims, 14 Drawing Sheets

(51) Int. Cl.
*H04B 7/08* (2006.01)
*H04L 5/00* (2006.01)
*H04W 24/08* (2009.01)
*H04W 72/04* (2009.01)
*H04W 72/12* (2009.01)
*H04W 88/02* (2009.01)

(52) U.S. Cl.
CPC ........... *H04B 7/088* (2013.01); *H04L 5/0055* (2013.01); *H04W 24/08* (2013.01); *H04W 72/046* (2013.01); *H04W 72/1284* (2013.01); *H04W 88/02* (2013.01)

(56) References Cited

U.S. PATENT DOCUMENTS

| | | | |
|---|---|---|---|
| 9,413,503 B2* | 8/2016 | Ahn | H04L 5/0051 |
| 9,717,084 B2* | 7/2017 | Nishikawa | H04W 72/1257 |
| 10,117,188 B2* | 10/2018 | Nory | H04W 52/146 |
| 10,271,288 B2* | 4/2019 | Pelletier | H04W 52/343 |
| 2013/0223251 A1 | 8/2013 | Li | |
| 2013/0322280 A1 | 12/2013 | Pi | |
| 2014/0293947 A1* | 10/2014 | Nishikawa | H04W 72/1257 |
| | | | 370/329 |
| 2014/0314014 A1* | 10/2014 | Zhang | H04W 52/146 |
| | | | 370/329 |
| 2016/0254892 A1* | 9/2016 | Kim | H04W 52/34 |
| | | | 370/280 |
| 2016/0286568 A1* | 9/2016 | Leroux | H04L 5/0073 |
| 2017/0013565 A1* | 1/2017 | Pelletier | H04W 52/343 |
| 2017/0215198 A1* | 7/2017 | Chen | H04W 72/1205 |
| 2018/0242317 A1* | 8/2018 | Marinier | H04W 72/042 |
| 2018/0302916 A1* | 10/2018 | Lee | H04L 5/00 |
| 2018/0375619 A1* | 12/2018 | Hwang | H04B 7/26 |
| 2019/0215783 A1* | 7/2019 | Chakraborty | H04W 52/146 |
| 2019/0230602 A1* | 7/2019 | Gao | H04W 52/346 |

FOREIGN PATENT DOCUMENTS

| | | |
|---|---|---|
| WO | 2015149273 | 10/2015 |
| WO | 2016069193 | 5/2016 |
| WO | 2016134532 | 9/2016 |

OTHER PUBLICATIONS

Communication pursuant to Article 94(3) EPC from corresponding EP Application No. 17194482.0, dated Mar. 18, 2019.

* cited by examiner

| TDD UL/DL Configuration | subframe number $i$ | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | 7 | 4 | - | - | 6 | 7 | 4 |
| 1 | - | - | 6 | 4 | - | - | - | 6 | 4 | - |
| 2 | - | - | 4 | - | - | - | - | 4 | - | - |
| 3 | - | - | 4 | 4 | 4 | - | - | - | - | - |
| 4 | - | - | 4 | 4 | - | - | - | - | - | - |
| 5 | - | - | 4 | - | - | - | - | - | - | - |
| 6 | - | - | 7 | 7 | 5 | - | - | 7 | 7 | - |

FIG. 6 (PRIOR ART)

| TPC Command Field in DCI format 0/3/4 | Accumulated $\delta_{PUSCH,c}$ [dB] | Absolute $\delta_{PUSCH,c}$ [dB] only DCI format 0/4 |
|---|---|---|
| 0 | -1 | -4 |
| 1 | 0 | -1 |
| 2 | 1 | 1 |
| 3 | 3 | 4 |

FIG. 7 (PRIOR ART)

| TPC Command Field in DCI format 3A | Accumulated $\delta_{PUSCH,c}$ [dB] |
|---|---|
| 0 | -1 |
| 1 | 1 |

FIG. 8 (PRIOR ART)

| TPC Command Field in DCI format 1A/1B/1D/1/2A/2B/2C/2D/2/3 | $\delta_{PUCCH}$ [dB] |
|---|---|
| 0 | -1 |
| 1 | 0 |
| 2 | 1 |
| 3 | 3 |

FIG. 9 (PRIOR ART)

| TPC Command Field in DCI format 3A | $\delta_{PUCCH}$ [dB] |
|---|---|
| 0 | -1 |
| 1 | 1 |

FIG. 10 (PRIOR ART)

| Value of SRS request field | Description |
|---|---|
| '00' | No type 1 SRS trigger |
| '01' | The $1^{st}$ SRS parameter set configured by higher layers |
| '10' | The $2^{nd}$ SRS parameter set configured by higher layers |
| '11' | The $3^{rd}$ SRS parameter set configured by higher layers |

FIG. 11 (PRIOR ART)

| Second Tx/Rx \ First Tx/Rx | Data | SR | HARQ-ACK | CSI | signal for channel measurement | signal for beam management |
|---|---|---|---|---|---|---|
| Data | X or Alt. a | X | Alt. b or Alt. c | Alt. b or Alt. c | Alt. a | Alt. a |
| SR | X | Alt. a | Alt. a or Alt. c (or Alt. b) | Alt. a or Alt. c (or Alt. b) | Alt. a | Alt. a |
| HARQ-ACK | X or Alt. a | Alt. c (or Alt. b) | Alt. a or Alt. c (or Alt. b) | Alt. a or Alt. c (or Alt. b) | Alt. a | Alt. a |
| CSI | X or Alt. a | Alt. c (or Alt. b) | Alt. a or Alt. c (or Alt. b) | Alt. a or Alt. c (or Alt. b) | Alt. a | Alt. a |
| signal for channel measurement | X | Alt. a or Alt. b | Alt. a or Alt. b | Alt. a or Alt. b | Alt. a | X |
| signal for beam management | X or Alt. a | Alt. a or Alt. b | Alt. a or Alt. b | Alt. a or Alt. b | Alt. a | X or Alt. a |

METHOD AND APPARATUS FOR USER EQUIPMENT BEAMFORMING OPERATION IN A WIRELESS COMMUNICATION SYSTEM

CROSS-REFERENCE TO RELATED APPLICATIONS

The present application claims the benefit of U.S. Provisional Patent Application Ser. No. 62/417,690 filed on Nov. 4, 2016, the entire disclosure of which is incorporated herein in its entirety by reference.

FIELD

This disclosure generally relates to wireless communication networks, and more particularly, to a method and apparatus for user equipment beamforming operation in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods and apparatuses for user equipment beamforming operation in a wireless communication system are disclosed herein. In one method, a user equipment receives a first configuration or a first scheduling to request the UE to perform a first Uplink (UL) transmission on a first UE beam, wherein the first UL transmission is to be performed in a first time unit. The UE receives a second configuration or a second scheduling to request the UE to perform a second UL transmission on a second UE beam, wherein the second UL transmission is to be performed in a second time unit. The UE performs the first UL transmission on the first UE beam and drops the second UL transmission on the second UE beam if the second time unit is at least partially overlapped with the first time unit

BRIEF DESCRIPTION OF THE DRAWINGS

FIG. 6 is a reproduction of Table 5.1.1.1-1 from 3GPP TS 36.213 v13.3.0 illustrating $K_{PUSCH}$ for TDD configuration 0-6.

FIG. 7 is a reproduction of Table 5.1.1.1-2 from 3GPP TS 36.213 v13.3.0 providing the mapping of TPC Command Field in DCI format 0/3/4 to absolute and accumulated $\delta_{PUSCH,c}$ values.

FIG. 8 is a reproduction of Table 5.1.1.1-3 from 3GPP TS 36.213 v13.3.0 providing the mapping of TPC Command Field in DCI format 3A to accumulated $\delta_{PUSCH,c}$ values.

FIG. 9 is a reproduction of Table 5.1.2.1-1 from 3GPP TS 36.213 v13.3.0 providing mapping of TPC Command Field in DCI format 1A/1B/1D/1/2A/2B/2C/2D/2/3 to $\delta_{PUCCH}$ values.

FIG. 10 is a reproduction of Table 5.1.2.1-2 from 3GPP TS 36.213 v13.3.0 providing mapping of TPC Command Field in DCI format 3A to $\delta_{PUCCH}$ values.

FIG. 11 is a reproduction of Table 8.1-1 from TS 36.213 v13.3.0 providing SRS request value for trigger type 1 in DCI format 4.

FIG. 12 is a table for showing various alternatives for dealing with different situations of the first transmission/reception and the second transmission/reception according to exemplary embodiments disclosed herein.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: R2-162366, "Beam Forming Impacts"; R2-163716, "Discussion on terminology of beamforming based high frequency NR"; R2-162709, "Beam support in NR"; R2-162762, "Active Mode Mobility in NR: SINR drops in higher frequencies"; R2-162251, "RAN2 aspects of high frequency New RAT"; and TS 36.213 v13.3.0, "E-UTRA Physical layer procedures (Release 13)." The standards and documents listed above are hereby expressly incorporated by reference in their entirety.

Figure 1:
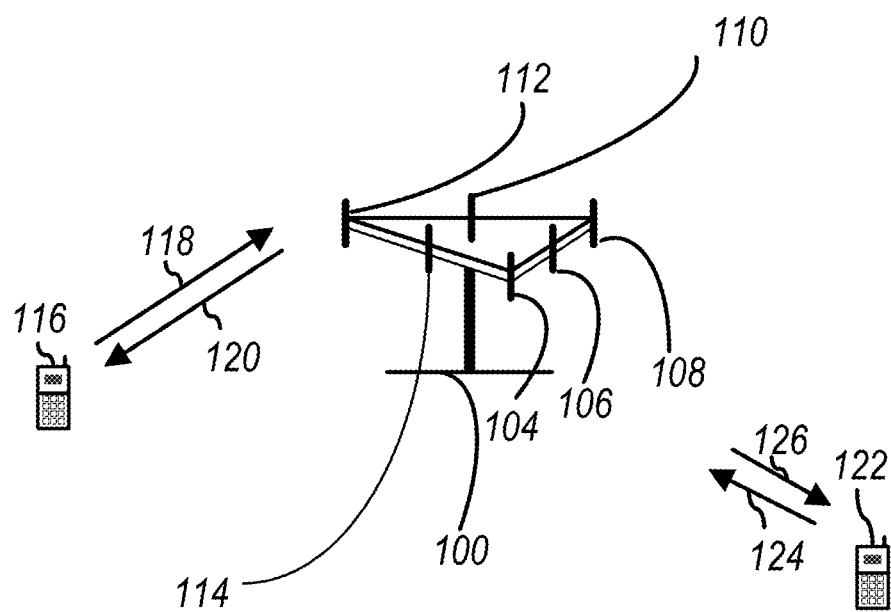
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
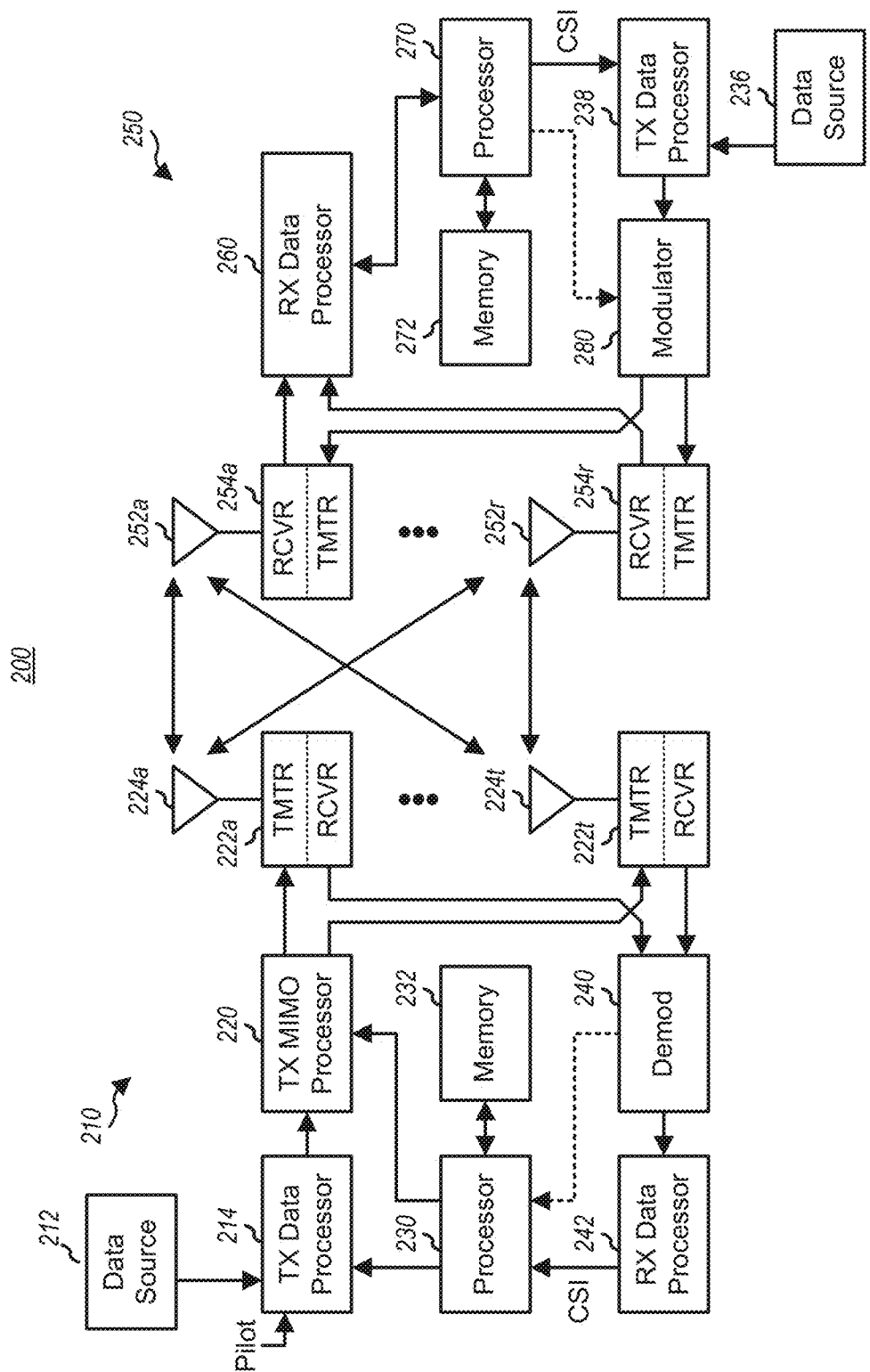
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
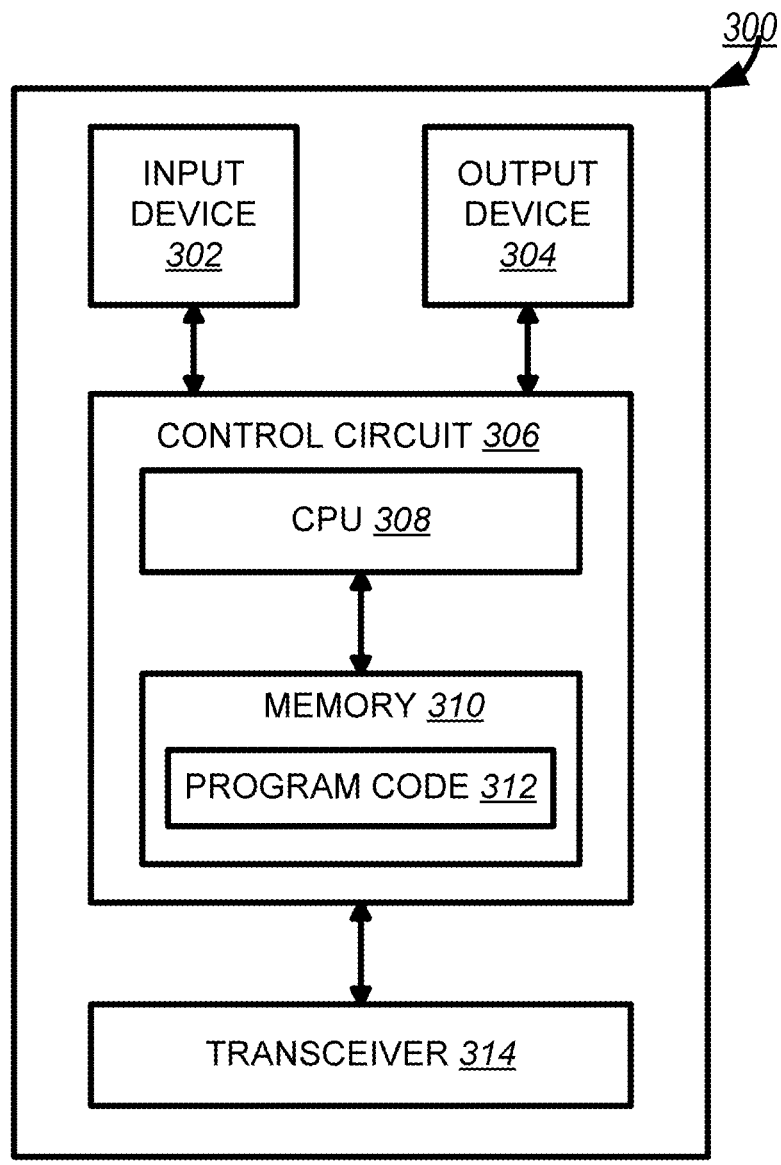
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
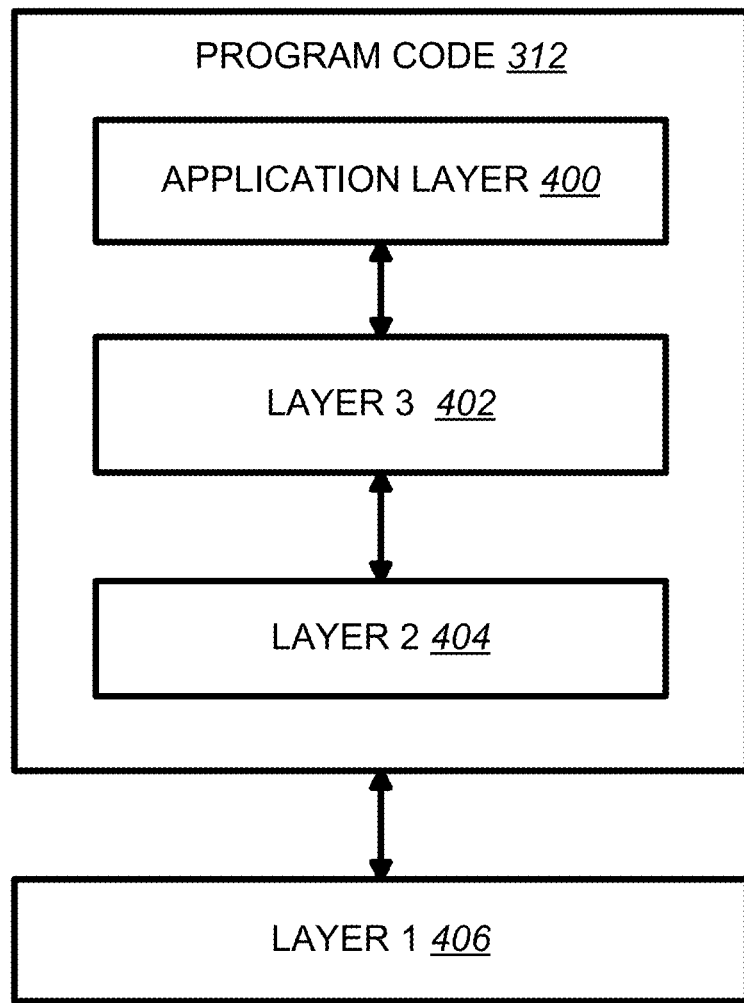
FIG. 4 is a functional block diagram of the program code of FIG. 3 according to one exemplary embodiment.
Figure 5A:
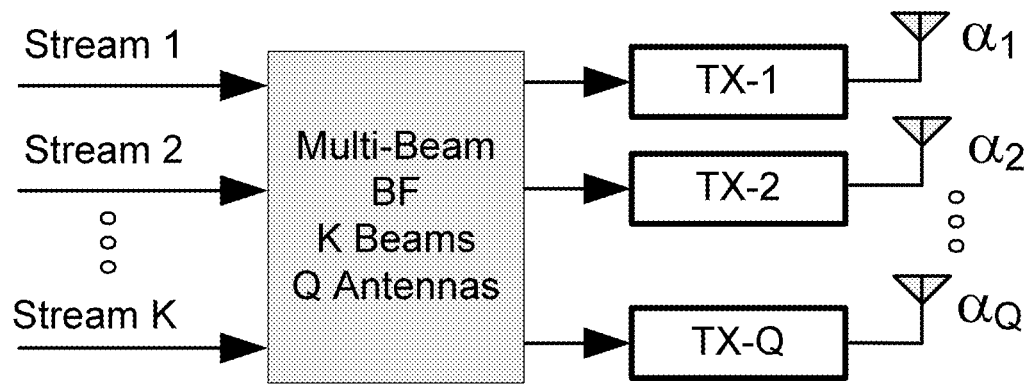
FIG. 5A is an example of digital beamforming.
Figure 5B:
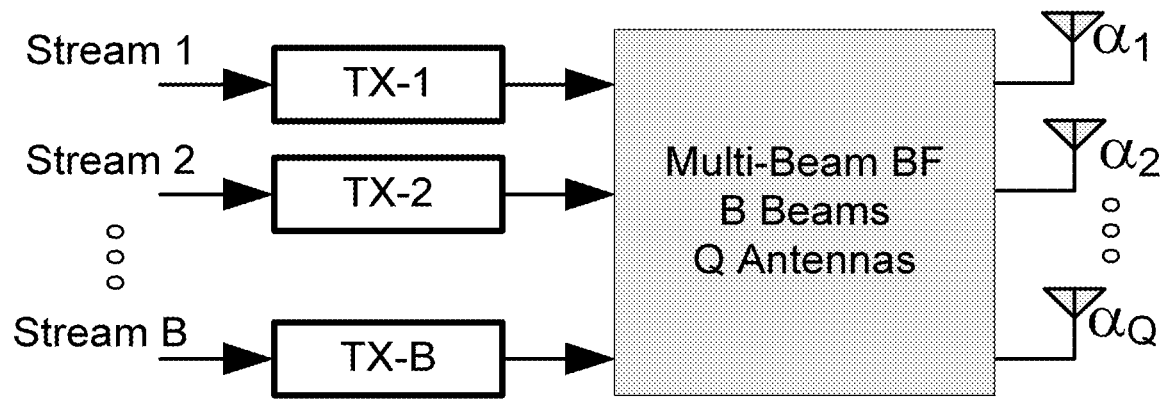
FIG. 5B is an example of analogue beamforming.
Figure 5C:
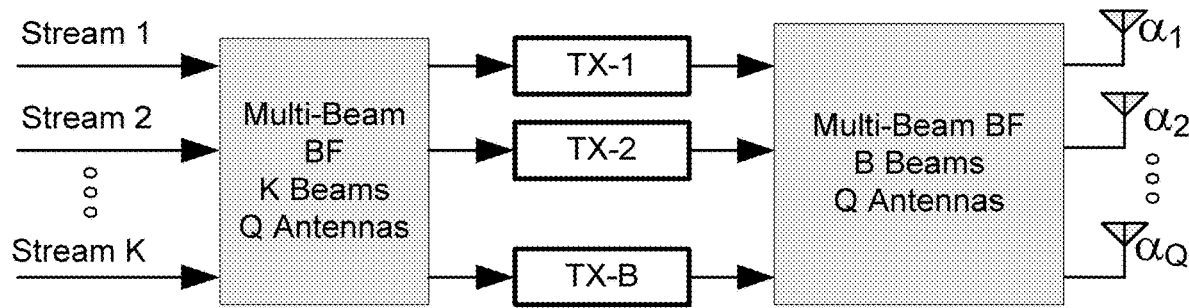
FIG. 5C is an example of hybrid beamforming, fully connected.
Figure 5D:
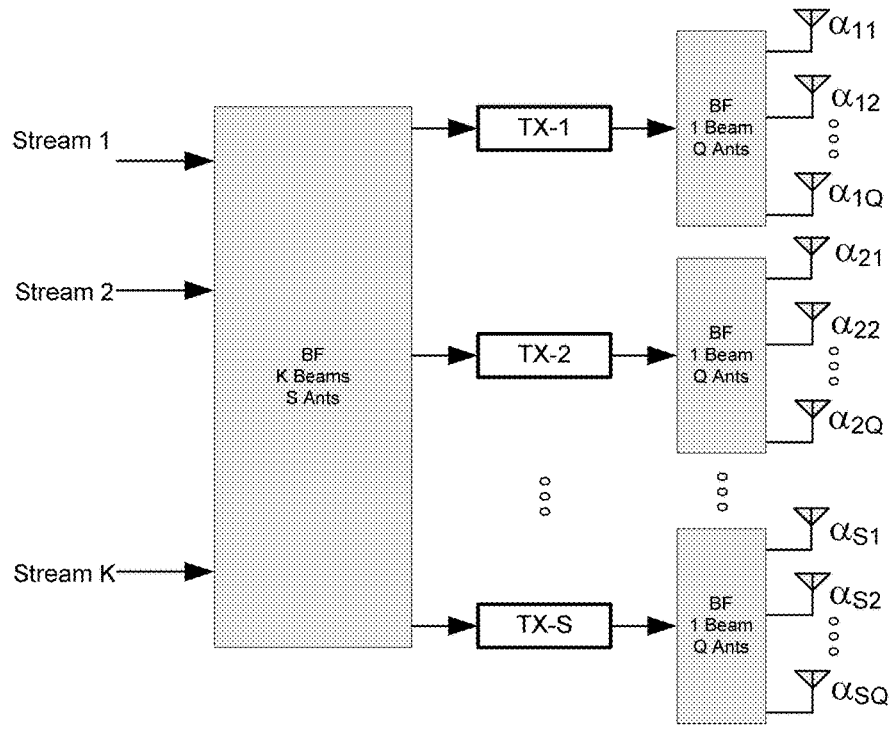
FIG. 5D is an example of hybrid beamforming, sub-array.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

As described in 3GPP R2-162366, in lower frequency bands (e.g., current LTE bands <6 GHz), the required cell coverage may be provided by forming a wide sector beam for transmitting downlink common channels. However, utilizing wide sector beam on higher frequencies (>>6 GHz) the cell coverage is reduced with same antenna gain. Thus, in order to provide required cell coverage on higher frequency bands, higher antenna gain is needed to compensate for the increased path loss. To increase the antenna gain over a wide sector beam, larger antenna arrays (number of antenna elements ranging from tens to hundreds) are used to form high gain beams.

As a consequence, the high gain beams are narrow compared to a wide sector beam. As a result, multiple beams for transmitting downlink common channels are needed to cover the required cell area. The number of concurrent high gain beams that an access point is able to form may be limited by the cost and complexity of the utilized transceiver architecture. In practice, on higher frequencies, the number of concurrent high gain beams is much less than the total number of beams required to cover the cell area. In other words, the access point is able to cover only part of the cell area by using a subset of beams at any given time.

As described in 3GPP R2-163716, beamforming is a signal processing technique used in antenna arrays for directional signal transmission/reception. With beamforming, a beam can be formed by combining elements in a phased array of antennas in such a way that certain signals at particular angles experience constructive interference while other signals experience destructive interference. Different beams can be utilized simultaneously using multiple arrays of antennas.

Beamforming can be categorized into three types of implementations: digital beamforming, hybrid beamforming, and analog beamforming as shown in FIGS. 5A-5D. For digital beamforming, the beam is generated on the digital domain, i.e. the weighting of each antenna element can be controlled by a baseband (e.g., connected to a transceiver unit (TXRU)). Therefore, it is very easy to tune the beam direction of each sub-band differently across the system bandwidth. Also, changing beam direction from time to time does not require any switching time between orthogonal frequency division multiplexing (OFDM) symbols. All beams whose directions cover the whole coverage can be generated simultaneously. However, this structure requires (almost) one-to-one mapping between TXRU (transceiver/RF chain) and antenna element and is quite complicated as the number of antenna element increases and system bandwidth increases (also heat problem exists). For analog beamforming, the beam is generated on the analog domain. That is, the weighting of each antenna element can be controlled by an amplitude/phase shifter in the Radio Frequency (RF) circuit. Since the weighting is purely controlled by the circuit, the same beam direction would apply on the whole system bandwidth. Also, if beam direction is to be changed, switching time is required. The number of beams generated simultaneously by an analog beamforming depends on the number of TXRU. For a given size of an array, the increase of TXRU may decrease the antenna element of each beam so that a wider beam would be generated. In sum, analog beamforming could avoid the complexity and heat problem of digital beamforming, while is more restricted in beam operation. Hybrid beamforming can be considered as a compromise between analog and digital beamforming as the beam can come from both analog and digital domain. The three types of beamforming are shown in FIG. 5.

In 3GPP R2-162709, an evolved Node B (eNB) may have multiple transmission/reception points (TRPs) that are either centralized or distributed. Each TRP can form multiple beams. The number of beams and the number of simultaneous beams in the time/frequency domain depend on the number of antenna array elements and the RF at the TRP.

The potential mobility type for a New Radio (NR) can be listed as follows: intra-TRP mobility; inter-TRP mobility; and inter-NR eNB mobility.

In 3GPP R2-162762, the reliability of a system purely relying on beamforming and operating in higher frequencies might be challenging because coverage may be more sensitive to both time and space variations. As a consequence, the Signal to Interference Plus Noise Ratio (SINR) of a narrow link can drop much quicker than in the case of Long Term Evolution (LTE).

Using antenna arrays at access nodes with the number of elements in the hundreds, a fairly regular grid-of-beams coverage pattern with tens or hundreds of candidate beams per node may be created. The coverage area of an individual beam from such array may be small, down to the order of tens of meters in width. As a consequence, channel quality degradation outside the current serving beam area is quicker than in the case of wide area coverage, as provided by LTE.

In RAN1 #85 meeting, some agreements about beamforming are quoted as below:
Agreements:
 Following three implementations of beamforming are to be studied in NR
  Analog beamforming
  Digital beamforming
  Hybrid beamforming
  Note: The physical layer procedure design for NR can be agnostic to UE/TRP with respect to the beamforming implementations employed at TRP/UE, but it may pursue beamforming implementation specific optimization not to lose efficiency
 RAN1 studies both multi-beam based approaches and single-beam based approaches for these channels/signals/measurement/feedback
  Initial-access signals (synchronization signals and random access channels)
  System-information delivery
  RRM measurement/feedback
  L1 control channel
  Others are FFS
  Note: The physical layer procedure design for NR can be unified as much as possible whether multi-beam or single-beam based approaches are employed at TRP at least for synchronization signal detection in stand-alone initial access procedure Note: single beam approach can be a special case of multi beam approach Note: Individual optimization of single beam approach and multiple beam approach is possible Multi-beam based approaches In Multi-beam based approaches, multiple beams are used for covering a DL coverage area and/or UL coverage distance of a TRP/a UE One example of multi-beam based approaches is beam sweeping:

When beam sweeping is applied for a signal (or a channel), the signal (the channel) is transmitted/received on multiple beams, which are on multiple time instances in finite time duration Single/multiple beam can be transmitted/received in a single time instance Others are FFS Single-beam based approaches In single-beam based approaches, the single beam can be used for covering a DL coverage area and/or UL coverage distance of a TRP/a UE, similarly as for LTE cell-specific channels/RS For both single-beam and multi-beam based approaches, RAN1 can consider followings in addition Power boosting

SFN

Repetition

Beam diversity (only for multi-beam approach)

Antenna diversity

Other approaches are not precluded

Combinations of single-beam based and multi-beam based approaches are not precluded Agreements:

RAN1 to study the beamforming procedures and their system impacts at least for multi beam based approach Physical layer procedures for beamforming optimizing different metrics such as overheads and latencies in multi beam and single beam based approaches Physical layer procedures in multi beam based approach that require beam training, i.e. steering of transmitter and/or receiver beams E.g. Periodic/Aperiodic downlink/uplink TX/RX beam sweeping signals, where periodic signals may be semi-statically or dynamically configured (FFS)

E.g. UL sounding signals

Other example is not precluded

Agreements:

Both intra-TRP and inter-TRP beamforming procedures are considered.

Beamforming procedures are considered with/without TRP beamforming/beam sweeping and with/without UE beamforming/beam sweeping, according to the following potential use cases:

UE movement, UE rotation, beam blocking:

Change of beam at TRP, same beam at UE

Same beam at TRP, change of beam at UE

Change of beam at TRP, change of beam at UE

Other cases are not precluded

With the support of beam operation and TRP, a cell may have multiple choices to schedule a UE. For example, there may be multiple beams from a TRP transmitting the same data to the UE, which can provide more reliability for the transmission. Alternatively, multiple beams from multiple TRPs transmit the same data to the UE. To increase throughput, it is also possible for a single TRP to transmit different data on different beams for the UE. Also, multiple TRPs can transmit different data on different beams to the UE.

3GPP R2-162251 mentions the possibility of performing beamforming at eNB side and at UE side as quoted below:

2.5 Beamforming with Antenna Gain

Based on the above observations, the HF-NR system has larger path loss, effective noise power and signal variation than conventional LTE system. To overcome, it is well known that beamforming with antenna gain, shown in FIG. 3, is necessary. These beamforming can be applied for both data and control channel. Beamforming with sharp beam width and high antenna gain is used in both eNB and UE sides. Practically, antenna gain by beamforming in eNB is considered about 15 to 30 dBi. The antenna gain of UE is considered about 3 to 20 dBi.

2.6 Less Interferences Due to Sharp Beamforming

In SINR perspective, one good news of sharp beamforming reduces interference power from neighbor interferers, i.e. neighbor eNBs in downlink case or other UEs connected to neighbor eNBs. In TX beamforming case, only interference from other TXs whose current beam points the same direction to the RX will be the "effective" interference. The "effective" interference means that the interference power is higher than the effective noise power. In RX beamforming case, only interference from other TXs whose beam direction is the same to the UE's current RX beam direction will be the effective interference. As being well known in academia, a HF system with beamforming is noise-limited, whereas conventional LTE system is interference limited.

With the support of beam operation and TRP, a cell may have multiple choices to schedule a UE. For example, there may be multiple beams from a TRP transmitting the same data to the UE, which can provide more reliability for the transmission. Alternatively, multiple beams from multiple TRPs transmit the same data to the UE. To increase the throughput, it is also possible for a single TRP to transmit different data on different beams for the UE. Also, multiple TRPs can transmit different data on different beams to the UE.

In LTE system, the UL transmit power is determined by multiple factors wherein one of the factors is the DL pathloss. The pathloss is derived from Cell-specific Reference Signal (CRS) measurement. More detail information can be found in section 5 of 3GPP TS 36.213 v13.3.0, as quoted below:

5 Power Control

Downlink power control determines the Energy Per Resource Element (EPRE). The term resource element energy denotes the energy prior to CP insertion. The term resource element energy also denotes the average energy taken over all constellation points for the modulation scheme applied. Uplink power control determines the average power over a SC-FDMA symbol in which the physical channel is transmitted.

5.1 Uplink Power Control

Uplink power control controls the transmit power of the different uplink physical channels.

For PUSCH, the transmit power $\hat{P}_{PUSCH,c}(i)$ defined in subclause 5.1.1, is first scaled by the ratio of the number of antennas ports with a non-zero PUSCH transmission to the number of configured antenna ports for the transmission scheme. The resulting scaled power is then split equally across the antenna ports on which the non-zero PUSCH is transmitted.

For PUCCH or SRS, the transmit power $\hat{P}_{PUCCH,c}(i)$ defined in subclause 5.1.1.1, or $\hat{P}_{SRS,c}(i)$ is split equally across the configured antenna ports for PUCCH or SRS. $\hat{P}_{SRS,c}(i)$ is the linear value of $P_{SRS,c}(i)$ defined in subclause 5.1.3.

A cell wide overload indicator (OI) and a High Interference Indicator (HIT) to control UL interference are defined in [9].

For a serving cell with frame structure type 1, a UE is not expected to be configured with UplinkPowerControlDedicated-v12x0.

5.1.1 Physical Uplink Shared Channel

If the UE is configured with a SCG, the UE shall apply the procedures described in this clause for both MCG and SCG When the procedures are applied for MCG, the terms 'secondary cell', 'secondary cells', 'serving cell', 'serving cells' in this clause refer to secondary cell, secondary cells, serving cell, serving cells belonging to the MCG respectively.

When the procedures are applied for SCG, the terms 'secondary cell', 'secondary cells', 'serving cell', 'serving cells' in this clause refer to secondary cell, secondary cells (not including PSCell), serving cell, serving cells belonging to the SCG respectively. The term 'primary cell' in this clause refers to the PSCell of the SCG.

If the UE is configured with a PUCCH-SCell, the UE shall apply the procedures described in this clause for both primary PUCCH group and secondary PUCCH group When the procedures are applied for primary PUCCH group, the terms 'secondary cell', 'secondary cells', 'serving cell', 'serving cells' in this clause refer to secondary cell, secondary cells, serving cell, serving cells belonging to the primary PUCCH group respectively.

When the procedures are applied for secondary PUCCH group, the terms 'secondary cell', 'secondary cells', 'serving cell', 'serving cells' in this clause refer to secondary cell, secondary cells, serving cell, serving cells belonging to the secondary PUCCH group respectively.

5.1.1.1 UE Behaviour

The setting of the UE Transmit power for a Physical Uplink Shared Channel (PUSCH) transmission is defined as follows.

If the UE transmits PUSCH without a simultaneous PUCCH for the serving cell c, then the UE transmit power $P_{PUSCH,c}(i)$ for PUSCH transmission in subframe i for the serving cell c is given by $$P_{PUSCH,c}(i) = \min \begin{Bmatrix} P_{CMAX,c}(i), \\ 10\log_{10}(M_{PUSCH,c}(i)) + \\ P_{O\_PUSCH,c}(j) + \alpha_c(j) \cdot PL_c + \Delta_{TF,c}(i) + f_c(i) \end{Bmatrix} [dBm]$$

If the UE transmits PUSCH simultaneous with PUCCH for the serving cell c, then the UE transmit power $P_{PUSCH,c}(i)$ for the PUSCH transmission in subframe i for the serving cell c is given by $$P_{PUSCH,c}(i) = \min \begin{Bmatrix} 10\log_{10}(\hat{P}_{CMAX,c}(i) - \hat{P}_{PUCCH}(i)), \\ 10\log_{10}(M_{PUSCH,c}(i)) + \\ P_{O\_PUSCH,c}(j) + \alpha_c(j) \cdot PL_c + \Delta_{TF,c}(i) + f_c(i) \end{Bmatrix} [dBm]$$

If the UE is not transmitting PUSCH for the serving cell c, for the accumulation of TPC command received with DCI format 3/3A for PUSCH, the UE shall assume that the UE transmit power P PUSCH,c (i) for the PUSCH transmission in subframe i for the serving cell c is computed by $$P_{PUSCH,c}(i) = \min\{P_{CMAX,c}(i), P_{O\_PUSCH,c}(1) + \alpha_c(1) \cdot PL_c + f_c(i)\}[dBm]$$

where, $P_{CMAX,c}(i)$ is the configured UE transmit power defined in [6] in subframe i for serving cell c and $\hat{P}_{CMAX,c}(i)$ is the linear value of $P_{CMAX,c}(i)$. If the UE transmits PUCCH without PUSCH in subframe i for the serving cell c, for the accumulation of TPC command received with DCI format 3/3A for PUSCH, the UE shall assume $P_{CMAX,c}(i)$ as given by subclause 5.1.2.1. If the UE does not transmit PUCCH and PUSCH in subframe i for the serving cell c, for the accumulation of TPC command received with DCI format 3/3A for PUSCH, the UE shall compute $P_{CMAX,c}(i)$ assuming MPR=0 dB, A-MPR=0 dB, P-MPR=0 dB and $\Delta T_C$=0 dB, where MPR, A-MPR, P-MPR and $\Delta T_C$ are defined in [6].

$\hat{P}_{PUCCH}(i)$ is the linear value of $P_{PUCCH}(i)$ defined in subclause 5.1.2.1

$M_{PUSCH,c}(i)$ is the bandwidth of the PUSCH resource assignment expressed in number of resource blocks valid for subframe i and serving cell c.

If the UE is configured with higher layer parameter UplinkPowerControlDedicated-v12x0 for serving cell c and if subframe i belongs to uplink power control subframe set 2 as indicated by the higher layer parameter tpc-SubframeSet-r12, when j=0, $P_{O\_PUSCH,c}(0) = P_{O\_UE\_PUSCH,c}2(0) + P_{O\_NOMINAL\_PUSCH,c}2(0)$ where j=0 is used for PUSCH (re)transmissions corresponding to a semi-persistent grant. $P_{O\_UE\_PUSCH,c}2(0)$ and $P_{O\_NOMINAL\_PUSCH,c}2(0)$ are the parameters p0-UE-PUSCH-Persistent-SubframeSet2-r12 and p0-NominalPUSCH-Persistent-SubframeSet2-r12 respectively provided by higher layers, for each serving cell c.

when j=1, $P_{O\_PUSCH,c}(1) = P_{O\_UE\_PUSCH,c}2(1) + P_{O\_UE\_PUSCH,c}2(1)$ where j=1 is used for PUSCH (re)transmissions corresponding to a dynamic scheduled grant. $P_{O\_UE\_PUSCH,c}2(1)$ and $P_{O\_UE\_PUSCH,c}2(1)$ are the parameters p0-UE-PUSCH-SubframeSet2-r12 and p0-NominalPUSCH-SubframeSet2-r12 respectively, provided by higher layers for serving cell c.

when j=2, $P_{O\_PUSCH,c}(2) = P_{O\_PUSCH,c}(2) + P_{O\_PUSCH,c}(2)$ where $P_{O\_PUSCH,c}(2) = 0$ and $P_{O\_NOMINAL\_PUSCH,c}(2) = P_{O\_PRE} + \Delta_{PREAMBLE\_Msg3}$, where the parameter preambleInitialReceivedTargetPower [8] ($P_{O\_PRE}$) and $\Delta_{PREAMBLE\_Msg3}$ are signalled from higher layers for serving cell c, where j=2 is used for PUSCH (re)transmissions corresponding to the random access response grant.

Otherwise $P_{O\_PUSCH,c}(j)$ is a parameter composed of the sum of a component $P_{O\_NOMINAL\_PUSCH,c}(j)$ provided from higher layers for j=0 and 1 and a component $P_{O\_UE\_PUSCH,c}(j)$ provided by higher layers for j=0 and 1 for serving cell c. For PUSCH (re)transmissions corresponding to a semi-persistent grant then j=0, for PUSCH (re)transmissions corresponding to a dynamic scheduled grant then j=1 and for PUSCH (re)transmissions corresponding to the random access response grant then 1=2. $P_{O\_UE\_PUSCH,c}(2)=0$ and $P_{O\_NOMINAL\_PUSCH,c}(2)=P_{O\_PRE}+\Delta_{PREAMBLE\_Msg3}$ where the parameter preambleInitialReceivedTargetPower [8] ($P_{O\_PRE}$) and $\Delta_{PREAMBLE\_Msg3}$ are signalled from higher layers for serving cell c.

If the UE is configured with higher layer parameter UplinkPowerControlDedicated-v12x0 for serving cell c and if subframe i belongs to uplink power control subframe set 2 as indicated by the higher layer parameter tpc-SubframeSet-r12, For j=0 or 1, $\alpha_c(j)=\alpha_{c,2} \in \{0, 0.4, 0.5, 0.6, 0.7, 0.8, 0.9, 1\}$. $\alpha_{c,2}$ is the parameter alpha-SubframeSet2-r12 provided by higher layers for each serving cell c.

For j=2, $\alpha_c(j)=1$.

Otherwise

For j=0 or 1, $\alpha_c \in \{0, 0.4, 0.5, 0.6, 0.7, 0.8, 0.9, 1\}$ is a 3-bit parameter provided by higher layers for serving cell c. For j=2, $\alpha_c(j)=1$.

$PL_c$ is the downlink path loss estimate calculated in the UE for serving cell c in dB and $PL_c$=referenceSignalPower−higher layer filtered RSRP, where referenceSignalPower is provided by higher layers and RSRP is defined in [5] for the reference serving cell and the higher layer filter configuration is defined in [11] for the reference serving cell.

If serving cell c belongs to a TAG containing the primary cell then, for the uplink of the primary cell, the primary cell is used as the reference serving cell for determining referenceSignalPower and higher layer filtered RSRP. For the uplink of the secondary cell, the serving cell configured by the higher layer parameter pathlossReferenceLinking defined in [11] is used as the reference serving cell for determining referenceSignalPower and higher layer filtered RSRP.

If serving cell c belongs to a TAG containing the PSCell then, for the uplink of the PSCell, the PSCell is used as the reference serving cell for determining referenceSignalPower and higher layer filtered RSRP; for the uplink of the secondary cell other than PSCell, the serving cell configured by the higher layer parameter pathlossReferenceLinking defined in [11] is used as the reference serving cell for determining referenceSignalPower and higher layer filtered RSRP.

If serving cell c belongs to a TAG not containing the primary cell or PSCell then serving cell c is used as the reference serving cell for determining referenceSignalPower and higher layer filtered RSRP.

$\Delta_{TF,c}(i)=10\log_{10}((2^{BPRE \cdot K_s}-1) \cdot \beta_{offset}^{PUSCH})$ for $K_s=1.25$ and 0 for $K_s=0$ where $K_s$ is given by the parameter deltaMCS-Enabled provided by higher layers for each serving cell c. BPRE and $\beta_{offset}^{PUSCH}$, for each serving cell c, are computed as below. $K_s=0$ for transmission mode 2.

BPRE=$O_{CQI}/N_{RE}$ for control data sent via PUSCH without UL-SCH data and $$\sum_{r=0}^{C-1} K_r/N_{RE}$$

for other cases.

where C is the number of code blocks, $K_r$ is the size for code block r, $O_{CQI}$ is the number of CQI/PMI bits including CRC bits and $N_{RE}$ is the number of resource elements determined as $N_{RE}=M_{sc}^{PUSCH-initial} \cdot N_{symb}^{PUSCH-initial}$, where C, $K_r$, $M_{sc}^{PUSCH-initial}$ and $N_{symb}^{PUSCH-initial}$ are defined in [4].

$\beta_{offset}^{PUSCH}=\beta_{offset}^{CQI}$ control data sent via PUSCH without UL-SCH data and 1 for other cases.

$\delta_{PUSCH,c}$ is a correction value, also referred to as a TPC command and is included in PDCCH/EPDCCH with DCI format 0/4 or in MPDCCH with DCI format 6-0A for serving cell c or jointly coded with other TPC commands in PDCCH/MPDCCH with DCI format 3/3A whose CRC parity bits are scrambled with TPC-PUSCH-RNTI. If the UE is configured with higher layer parameter UplinkPowerControlDedicated-v12x0 for serving cell c and if subframe i belongs to uplink power control subframe set 2 as indicated by the higher layer parameter tpc-SubframeSet-r12, the current PUSCH power control adjustment state for serving cell c is given by $f_{c,2}$, and the UE shall use $f_{c,2}(i)$ instead of $f_c(i)$ to determine $P_{PUSCH,c}(i)$ Otherwise, the current PUSCH power control adjustment state for serving cell c is given by $f_c(i)$. $f_{c,2}(i)$ and $f_c(i)$ are defined by:

$f_c(i)=f_c(i-1)+\delta_{PUSCH,c}(i-K_{PUSCH})$ and $f_{c,2}(i)=f_{c,2}(i-1)+(\delta_{PUSCH,c}(i-K_{PUSCH}))$ if accumulation is enabled based on the parameter Accumulation-enabled provided by higher layers or if the TPC command a PUSCH,c is included in a PDCCH/EPDCCH with DCI format 0 or in a MPDCCH with DCI format 6-0A for serving cell c where the CRC is scrambled by the Temporary C-RNTI where $\delta_{PUSCH,c}(i-K_{PUSCH})$ was signalled on PDCCH/EPDCCH with DCI format 0/4 or MPDCCH with DCI format 6-0A or PDCCH/MPDCCH with DCI format 3/3A on subframe i-$K_{PUSCH}$ and where $f_c(0)$ is the first value after reset of accumulation. For a BL/CE UE configured with CEModeA, subframe i-$K_{PUSCH}$ is the last subframe in which the MPDCCH with DCI format 6-0A or MPDCCH with DCI format 3/3A is transmitted.

The value of $K_{PUSCH}$ is

For FDD or FDD-TDD and serving cell frame structure type 1, $K_{PUSCH}=4$

For TDD, if the UE is configured with more than one serving cell and the TDD UL/DL configuration of at least two configured serving cells is not the same, or if the UE is configured with the parameter EIMTA-MainConfigServCell-r12 for at least one serving cell, or for FDD-TDD and serving cell frame structure type 2, the "TDD UL/DL configuration" refers to the UL-reference UL/DL configuration (defined in sub-clause 8.0) for serving cell c.

For TDD UL/DL configurations 1-6, $K_{PUSCH}$ is given in Table 5.1.1.1-1

For TDD UL/DL configuration 0

If the PUSCH transmission in subframe 2 or 7 is scheduled with a PDCCH/EPDCCH of DCI format 0/4 or a MPDCCH of DCI format 6-0A in which the LSB of the UL index is set to 1, $K_{PUSCH}=7$ For all other PUSCH transmissions, $K_{PUSCH}$ is given in Table 5.1.1.1-1.

For serving cell c and a non-BL/CE UE, the UE attempts to decode a PDCCH/EPDCCH of DCI format 0/4 with the UE's C-RNTI or DCI format 0 for SPS C-RNTI and a PDCCH of DCI format 3/3A with this UE's TPC-PUSCH-RNTI in every subframe except when in DRX or where serving cell c is deactivated.

For serving cell c and a BL/CE UE configured with CEModeA, the UE attempts to decode a MPD-CCH of DCI format 6-0A with the UE's C-RNTI or SPS C-RNTI and a MPDCCH of DCI format 3/3A with this UE's TPC-PUSCH-RNTI in every BL/CE downlink subframe except when in DRX For a non-BL/CE UE, if DCI format 0/4 for serving cell c and DCI format 3/3A are both detected in the same subframe, then the UE shall use the $\delta_{PUSCH,c}$ provided in DCI format 0/4.

a BL/CE UE configured with CEModeA, if DCI format 6-0A for serving cell c and DCI format 3/3A are both detected in the same subframe, then the UE shall use the $\delta_{PUSCH,c}$ provided in DCI format 6-0A.

$\delta_{PUSCH,c}=0$ dB for a subframe where no TPC command is decoded for serving cell c or where DRX occurs or i is not an uplink subframe in TDD or FDD-TDD and serving cell c frame structure type 2.

The $\delta_{PUSCH,c}$ dB accumulated values signalled on PDCCH/EPDCCH with DCI format 0/4 or MPD-CCH with DCI format 6-0A are given in Table 5.1.1.1-2. If the PDCCH/EPDCCH with DCI format 0 or MPDCCH with DCI format 6-0A is validated as a SPS activation or release PDCCH/EPDCCH/MPDCCH, then $\delta_{PUSCH,c}$ is 0 dB.

The $\delta_{PUSCH}$ dB accumulated values signalled on PDCCH/MPDCCH with DCI format 3/3A are one of SET1 given in Table 5.1.1.1-2 or SET2 given in Table 5.1.1.1-3 as determined by the parameter TPC-Index provided by higher layers.

If UE has reached $P_{CMAX,c}(i)$ for serving cell c, positive TPC commands for serving cell c shall not be accumulated If UE has reached minimum power, negative TPC commands shall not be accumulated If the UE is not configured with higher layer parameter UplinkPowerControlDedicated-v12x0 for serving cell c, the UE shall reset accumulation
  For serving cell c, when $P_{O\_UE\_PUSCH,c}$ value is changed by higher layers
  For serving cell c, when the UE receives random access response message for serving cell c If the UE is configured with higher layer parameter UplinkPowerControlDedicated-v12x0 for serving cell c,
  the UE shall reset accumulation corresponding to $f_c(*)$ for serving cell c
    when $P_{O\_UE\_PUSCH,c}$ value is changed by higher layers
    when the UE receives random access response message for serving cell c
  the UE shall reset accumulation corresponding to $f_{c,2}(*)$ for serving cell c
    when $P_{O\_UE\_PUSCH,c,2}$ value is changed by higher layers If the UE is configured with higher layer parameter UplinkPowerControlDedicated-v12x0 for serving cell c and
  if subframe i belongs to uplink power control subframe set 2 as indicated by the higher layer parameter tpc-SubframeSet-r12 $f_c(i)=(i-1)$
  if subframe i does not belong to uplink power control subframe set 2 as indicated by the higher layer parameter tpc-SubframeSet-r12 $f_{c,2}(i)=f_{c,2}(i-1)$ $f_c$ an $(i)=\delta_{PUSCH,c}(i-K_{PUSCH})$ and $f_{c,2}=\delta_{PUSCH,c}(i-K_{PUSCH})$ if accumulation is not enabled for serving cell c based on the parameter Accumulation-enabled provided by higher layers
  where $\delta_{PUSCH,c}(i-K_{PUSCH})$ was signalled on PDCCH/EPDCCH with DCI format 0/4 or MPD-CCH with DCI format 6-0A for serving cell c on subframe $i-K_{PUSCH}$. For a BL/CE UE configured with CEModeA, subframe $i-K_{PUSCH}$ is the last subframe in which the MPDCCH with DCI format 6-0A or MPDCCH with DCI format 3/3A is transmitted.

The value of $K_{PUSCH}$ is
  For FDD or FDD-TDD and serving cell frame structure type 1, $K_{PUSCH}=4$
  For TDD, if the UE is configured with more than one serving cell and the TDD UL/DL configuration of at least two configured serving cells is not the same, or if the UE is configured with the parameter EIMTA-MainConfigServCell-r12 for at least one serving cell, or FDD-TDD and serving cell frame structure type 2, the "TDD UL/DL configuration" refers to the UL-reference UL/DL configuration (defined in subclause 8.0) for serving cell c.
  For TDD UL/DL configurations 1-6, $K_{PUSCH}$ is given in Table 5.1.1.1-1.
  For TDD UL/DL configuration 0
    If the PUSCH transmission in subframe 2 or 7 is scheduled with a PDCCH/EPDCCH of DCI format 0/4 or a MPDCCH with DCI format 6-0A in which the LSB of the UL index is set to 1, $K_{PUSCH}=7$
    For all other PUSCH transmissions, $K_{PUSCH}$ is given in Table 5.1.1.1-1.

The $\delta_{PUSCH,c}$ dB absolute values signalled on PDCCH/EPDCCH with DCI format 0/4 or a MPDCCH with DCI format 6-0A are given in Table 5.1.1.1-2. If the PDCCH/EPDCCH with DCI format 0 or a MPDCCH with DCI format 6-0A is validated as a SPS activation or release PDCCH/EPDCCH/MPDCCH, then $\delta_{PUSCH,c}$ is 0 dB.

for a non-BL/CE UE, $f_c(i)=f_c(i-1)$ and $f_{c,2}(i)=f_{c,2}(i-1)$ for a subframe where no PDCCH/EPDCCH with DCI format 0/4 is decoded for serving cell c or where DRX occurs or i is not an uplink subframe in TDD or FDD-TDD and serving cell c frame structure type 2.

for a BL/CE UE configured with CEModeA, $f_c(i)=f_c(i-1)$ and $f_{c,2}(i)=f_{c,2}(i-1)$ for a subframe where no MPDCCH with DCI format 6-0A is decoded for serving cell c or where DRX occurs or i is not an uplink subframe in TDD.

If the UE is configured with higher layer parameter UplinkPowerControlDedicated-v12x0 for serving cell c and
  if subframe i belongs to uplink power control subframe set 2 as indicated by the higher layer parameter tpc-SubframeSet-r12 $f_c(i)=f_c(i-1)$ if subframe i does not belong to uplink power control subframe set 2 as indicated by the higher layer parameter tpc-SubframeSet-r12 $f_{c,2}(i)=f_{c,2}(i-1)$ For both types of $f_c(*)$ (accumulation or current absolute) the first value is set as follows:

If $P_{O\_UE\_PUSCH,c}$ value is changed by higher layers and serving cell c is the primary cell or, if $P_{O\_UE\_PUSCH,c}$ value is received by higher layers and serving cell c is a Secondary cell $f_c(0)=0$ Else If the UE receives the random access response message for a serving cell c $f_c(0)=\Delta P_{rampup,c}+\delta_{msg2,c}$, where $\delta_{msg2,c}$ is the TPC command indicated in the random access response corresponding to the random access preamble transmitted in the serving cell c, see subclause 6.2, and $$\Delta P_{rampup,c} = \min\left[\left\{\max\left(0, P_{CMAX,c} - \begin{pmatrix} 10\log_{10}(M_{PUSCH,c}(0)) + \\ P_{O\_PUSCH,c}(2) + \delta_{msg2} + \\ \alpha_c(2)\cdot PL + \Delta_{TF,c}(0) \end{pmatrix}\right)\right\}, \Delta P_{rampuprequested,c}\right]$$

and $\Delta P_{rampuprequested,c}$ is provided by higher layers and corresponds to the total power ramp-up requested by higher layers from the first to the last preamble in the serving cell c, $M_{PUSCH,c}(0)$ is the bandwidth of the PUSCH resource assignment expressed in number of resource blocks valid for the subframe of first PUSCH transmission in the serving cell c, and $\Delta_{TF,c}(0)$ is the power adjustment of first PUSCH transmission in the serving cell c.

If $P_{O\_UE\_PUSCHc,2}$ value is received by higher layers for a serving cell c.

$f_{c,2}(0)=0$

FIG. 6 (a reproduction of Table 5.1.1.1-1 from 3GPP TS 36.213 v13.3.0)

FIG. 7 (a reproduction of Table 5.1.1.1-2 from 3GPP TS 36.213 v13.3.0)

FIG. 8 (a reproduction of Table 5.1.1.1-3 from 3GPP TS 36.213 v13.3.0)

If the UE is not configured with an SCG or a PUCCH-SCell, and if the total transmit power of the UE would exceed $\hat{P}_{CMAX}(i)$, the UE scales $\hat{P}_{PUSCH,c}(i)$ for the serving cell c in subframe i such that the condition $$\sum_c w(i)\cdot\hat{P}_{PUSCH,c}(i) \le (\hat{P}_{CMAX}(i) - \hat{P}_{PUCCH}(i))$$

is satisfied where $\hat{P}_{PUCCH}(i)$ is the linear value of $P_{PUCCH}(i)$, $\hat{P}_{PUSCH,c}(i)$ is the linear value of $P_{PUSCH,c}(i)$ $\hat{P}_{CMAX}(i)$ is the linear value of the UE total configured maximum output power $P_{CMAX}$ defined in [6] in subframe i and w(i) is a scaling factor of $\hat{P}_{PUSCH,c}(i)$ for serving cell c where $0 \le w(i) \le 1$. In case there is no PUCCH transmission in subframe i $\hat{P}_{PUCCH}(i)=0$.

If the UE is not configured with an SCG or a PUCCH-Scell, and if the UE has PUSCH transmission with UCI on serving cell j and PUSCH without UCI in any of the remaining serving cells, and the total transmit power of the UE would exceed $\hat{P}_{CMAX}(i)$, the UE scales $\hat{P}_{PUSCH,c}(i)$ for the serving cells without UCI in subframe i such that the condition $$\sum_{c \ne j} w(i)\cdot\hat{P}_{PUSCH,c}(i) \le (\hat{P}_{CMAX}(i) - \hat{P}_{PUSCH,j}(i))$$

is satisfied where $\hat{P}_{PUSCH,j}(i)$ is the PUSCH transmit power for the cell with UCI and w(i) is a scaling factor of $\hat{P}_{PUSCH,c}(i)$ for serving cell c without UCI. In this case, no power scaling is applied to $P_{PUSCH,j}(i)$ unless $$\sum_{c \ne j} w(i)\cdot\hat{P}_{PUSCH,c}(i) = 0$$

and the total transmit power of the UE still would exceed $\hat{P}_{CMAX}(i)$

For a UE not configured with a SCG or a PUCCH-SCell, note that w(i) values are the same across serving cells when w(i)>0 but for certain serving cells w(i) may be zero.

If the UE is not configured with an SCG or a PUCCH-SCell, and if the UE has simultaneous PUCCH and PUSCH transmission with UCI on serving cell j and PUSCH transmission without UCI in any of the remaining serving cells, and the total transmit power of the UE would exceed $\hat{P}_{CMAX}(i)$, the UE obtains $\hat{P}_{PUSCH,c}(i)$ according to $$\hat{P}_{PUSCH,j}(i)=\min(\hat{P}_{PUSCH,j}(i),(\hat{P}_{CMAX}(i)-\hat{P}_{PUCCH}(i)))$$

and $$\sum_{c \ne j} w(i)\cdot\hat{P}_{PUSCH,c}(i) \le (\hat{P}_{CMAX}(i) - \hat{P}_{PUCCH}(i) - \hat{P}_{PUSCH,j}(i))$$

If the UE is not configured with a SCG or a PUCCH-SCell, and

If the UE is configured with multiple TAGs, and if the PUCCH/PUSCH transmission of the UE on subframe i for a given serving cell in a TAG overlaps some portion of the first symbol of the PUSCH transmission on subframe i+1 for a different serving cell in another TAG the UE shall adjust its total transmission power to not exceed $P_{CMAX}$ on any overlapped portion.

If the UE is configured with multiple TAGs, and if the PUSCH transmission of the UE on subframe i for a given serving cell in a TAG overlaps some portion of the first symbol of the PUCCH transmission on subframe i+1 for a different serving cell in another TAG the UE shall adjust its total transmission power to not exceed $P_{CMAX}$ on any overlapped portion.

If the UE is configured with multiple TAGs, and if the SRS transmission of the UE in a symbol on subframe i for a given serving cell in a TAG overlaps with the PUCCH/PUSCH transmission on subframe i or subframe i+1 for a different serving cell in the same or another TAG the UE shall drop SRS if its total transmission power exceeds $P_{CMAX}$ on any overlapped portion of the symbol.

If the UE is configured with multiple TAGs and more than 2 serving cells, and if the SRS transmission of the UE in a symbol on subframe i for a given serving cell overlaps with the SRS transmission on subframe i for a different serving cell(s) and with PUSCH/PUCCH transmission on subframe i or subframe i+1 for another serving cell(s) the UE shall drop the SRS transmissions if the total transmission power exceeds $P_{CMAX}$ on any overlapped portion of the symbol.

If the UE is configured with multiple TAGs, the UE shall, when requested by higher layers, to transmit PRACH in a secondary serving cell in parallel with SRS transmission in a symbol on a subframe of a different serving cell belonging to a different TAG, drop SRS if the total transmission power exceeds $P_{CMAX}$ on any overlapped portion in the symbol.

If the UE is configured with multiple TAGs, the UE shall, when requested by higher layers, to transmit PRACH in a secondary serving cell in parallel with PUSCH/PUCCH in a different serving cell belonging to a different TAG, adjust the transmission power of PUSCH/PUCCH so that its total transmission power does not exceed $P_{CMAX}$ on the overlapped portion.

For a BL/CE UE configured with CEModeA, if the PUSCH is transmitted in more than one subframe $i_0, i_1, \ldots, i_{N-1}$ where $i_0 < i_1 < \ldots < i_{N-1}$, the PUSCH transmit power in subframe $i_k$, $k=0, 1, \ldots, N-1$, is determined by $$P_{PUSCH,c}(i_k) = P_{PUSCH,c}(i_0)$$

For a BL/CE UE configured with CEModeB, the PUSCH transmit power in subframe $i_k$ is determined by $$P_{PUSCH,c}(i_k) P_{CMAX,c}(i_0)$$

5.1.2 Physical Uplink Control Channel

If the UE is configured with a SCG, the UE shall apply the procedures described in this subclause for both MCG and SCG.

When the procedures are applied for MCG, the term 'serving cell' in this subclause refers to serving cell belonging to the MCG.

When the procedures are applied for SCG, the term 'serving cell' in this subclause refers to serving cell belonging to the SCG. The term 'primary cell' in this subclause refers to the PSCell of the SCG. If the UE is configured with a PUCCH-SCell, the UE shall apply the procedures described in this subclause for both primary PUCCH group and secondary PUCCH group.

When the procedures are applied for the primary PUCCH group, the term 'serving cell' in this subclause refers to serving cell belonging to the primary PUCCH group.

When the procedures are applied for the secondary PUCCH group, the term 'serving cell' in this subclause refers to serving cell belonging to the secondary PUCCH group. The term 'primary cell' in this subclause refers to the PUCCH-SCell of the secondary PUCCH group.

5.1.2.1 UE Behaviour

If serving cell c is the primary cell, for PUCCH format 1/1a/1b/2/2a/2b/3, the setting of the UE Transmit power $P_{PUCCH}$ for the physical uplink control channel (PUCCH) transmission in subframe i for serving cell c is defined by $$P_{PUCCH}(i) = \min \left\{ \begin{array}{l} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{T \times D}(F') + g(i) \end{array} \right\} [dBm]$$

If serving cell c is the primary cell, for PUCCH format 4/5, the setting of the UE Transmit power $P_{PUCCH}$ for the physical uplink control channel (PUCCH) transmission in subframe i for serving cell c is defined by $$P_{PUCCH}(i) = \min \left\{ \begin{array}{l} P_{CMAX,c}(i), \\ P_{0\_PUCCH} + PL_c + 10\log_{10}(M_{PUCCH,c}(i)) + \\ \Delta_{TF,c}(i) + \Delta_{F\_PUCCH}(F) + g(i) \end{array} \right\} [dBm]$$

If the UE is not transmitting PUCCH for the primary cell, for the accumulation of TPC command for PUCCH, the UE shall assume that the UE transmit power $P_{PUCCH}$ for PUCCH in subframe i is computed by $$P_{PUCCH}(i) = \min\{P_{CMAX,c}(i), P_{0\_PUCCH} + PL_c + g(i)\} \quad [dBm]$$

where $P_{CMAX,c}(i)$ is the configured UE transmit power defined in [6] in subframe i for serving cell c. If the UE transmits PUSCH without PUCCH in subframe i for the serving cell c, for the accumulation of TPC command for PUCCH, the UE shall assume $P_{CMAX,c}(i)$ as given by subclause 5.1.1.1. If the UE does not transmit PUCCH and PUSCH in subframe i for the serving cell c, for the accumulation of TPC command for PUCCH, the UE shall compute $P_{CMAX,c}(i)$ assuming MPR=0 dB, A-MPR=0 dB, P-MPR=0 dB and $\Box T_C$=0 dB, where MPR, A-MPR, P-MPR and $\Box T_C$ are defined in [6].

The parameter $\Delta_{F\_PUCCH}(F)$ is provided by higher layers. Each $\Delta_{F\_PUCCH}(F)$ value corresponds to a PUCCH format (F) relative to PUCCH format 1a, where each PUCCH format (F) is defined in Table 5.4-1 of [3].

If the UE is configured by higher layers to transmit PUCCH on two antenna ports, the value of $\Delta_{T \times D}(F')$ is provided by higher layers where each PUCCH format F' is defined in Table 5.4-1 of [3]; otherwise, $\Delta_{T \times D}(F')=0$.

$h(n_{CQI}, n_{HARQ}, n_{SR})$ is a PUCCH format dependent value, where $n_{CQI}$ corresponds to the number of information bits for the channel quality information defined in subclause 5.2.3.3 in [4]. $n_{SR}=1$ if subframe i is configured for SR for the UE not having any associated transport block for UL-SCH, otherwise $n_{SR}=0$. If the UE is configured with more than one serving cell, or the UE is configured with one serving cell and transmitting using PUCCH format 3, the value of $n_{HARQ}$ is defined in subclause 10.1; otherwise, $n_{HARQ}$ is the number of HARQ-ACK bits sent in subframe i.

For PUCCH format 1,1a and 1b $h(n_{CQI}, n_{HARQ}, n_{SR})=0$

For PUCCH format 1b with channel selection, if the UE is configured with more than one serving cell, $$h(n_{CQI}, n_{HARQ}, n_{SR}) = \frac{(n_{HARQ} - 1)}{2}, \text{ otherwise,}$$

$$h(n_{CQI}, n_{HARQ}, n_{SR}) = 0$$

For PUCCH format 2, 2a, 2b and normal cyclic prefix $$h(n_{CQI}, n_{HARQ}, n_{SR}) = \begin{cases} 10\log_{10}\left(\frac{n_{CQI}}{4}\right) & \text{if } n_{CQI} \geq 4 \\ 0 & \text{otherwise} \end{cases}$$

For PUCCH format 2 and extended cyclic prefix $$h(n_{CQI}, n_{HARQ}, n_{SR}) = \begin{cases} 10\log_{10}\left(\frac{n_{CQI}+n_{HARQ}}{4}\right) & \text{if } n_{CQI}+n_{HARQ} \geq 4 \\ 0 & \text{otherwise} \end{cases}$$

For PUCCH format 3 and when UE transmits HARQ-ACK/SR without periodic CSI,
  If the UE is configured by higher layers to transmit PUCCH format 3 on two antenna ports, or if the UE transmits more than 11 bits of HARQ-ACK/SR $$h(n_{CQI}, n_{HARQ}, n_{SR}) = \frac{n_{HARQ}+n_{SR}-1}{3}$$

Otherwise $$h(n_{CQI}, n_{HARQ}, n_{SR}) = \frac{n_{HARQ}+n_{SR}-1}{2}$$

For PUCCH format 3 and when UE transmits HARQ-ACK/SR and periodic CSI,
  If the UE is configured by higher layers to transmit PUCCH format 3 on two antenna ports, or if the UE transmits more than 11 bits of HARQ-ACK/SR and CSI $$h(n_{CQI}, n_{HARQ}, n_{SR}) = \frac{n_{HARQ}+n_{SR}+n_{CQI}-1}{3}$$

Otherwise $$h(n_{CQI}, n_{HARQ}, n_{SR}) = \frac{n_{HARQ}+n_{SR}+n_{CQI}-1}{2}$$

For PUCCH format 4, $M_{PUCCH,c}(i)$ is the bandwidth of the PUCCH format 4 expressed in number of resource blocks valid for subframe i and serving cell c. For PUCCH format 5, $M_{PUCCH,c}(i)=1$.
$\Delta_{TF,c}(i)=10 \log_{10}(2^{1.25 \cdot BPRE(i)}-1)$ where $BPRE(i)=O_{UCI}(i)/N_{RE}(i)$,
  $O_{UCI}(i)$ is the number of HARQ-ACK/SR/RI/CQI/PMI bits including CRC bits transmitted on PUCCH format 4/5 in subframe i;
  $N_{RE(i)}=M_{PUCCH,c}(i) \cdot N_{sc}^{RB} \cdot N_{symb}^{PUCCH}$ for PUCCH format 4 and $N_{RE}(i)=N_{sc}^{RB} \cdot N_{symb}^{PUCCH}/2$ for PUCCH format 5;
  $N_{symb}^{PUCCH}=2 \cdot (N_{sym}^{UL}-1)-1$ if shortened PUCCH format 4 or shortened PUCCH format 5 is used in subframe i and $N_{symb}^{PUCCH}=2 \cdot (N_{symb}^{UL}-1)$ otherwise.

$P_{O\_PUCCH}$ is a parameter composed of the sum of a parameter $P_{O\_NOMINAL\_PUCCH}$ Provided by higher layers and a parameter $P_{O\_UE\_PUCCH}$ provided by higher layers.

$\delta_{PUCCH}$ is a UE specific correction value, also referred to as a TPC command, included in a PDCCH with DCI format 1A/1B/1D/1/2A/2/2B/2C/2D for the primary cell, or included in a MPDCCH with DCI format 6-1A, or included in an EPDCCH with DCI format 1A/1B/1D/1/2A/2/2B/2C/2D for the primary cell, or sent jointly coded with other UE specific PUCCH correction values on a PDCCH/MPDCCH with DCI format 3/3A whose CRC parity bits are scrambled with TPC-PUCCH-RNTI.

For a non-BL/CE UE, if the UE is not configured for EPDCCH monitoring, the UE attempts to decode a PDCCH of DCI format 3/3A with the UE's TPC-PUCCH-RNTI and one or several PDCCHs of DCI format 1A/1B/1D/1/2A/2/2B/2C/2D with the UE's C-RNTI or SPS C-RNTI on every subframe except when in DRX.

If a UE is configured for EPDCCH monitoring, the UE attempts to decode
  a PDCCH of DCI format 3/3A with the UE's TPC-PUCCH-RNTI and one or several PDCCHs of DCI format 1A/1B/1D/1/2A/2/2B/2C/2D with the UE's C-RNTI or SPS C-RNTI as described in subclause 9.1.1, and
  one or several EPDCCHs of DCI format 1A/1B/1D/1/2A/2/2B/2C/2D with the UE's C-RNTI or SPS C-RNTI, as described in subclause 9.1.4.

For a BL/CE UE configured with CEModeA, the UE attempts to decode a MPDCCH of DCI format 3/3A with the UE's TPC-PUCCH-RNTI and MPDCCH of DCI format 6-1A with the UE's C-RNTI or SPS C-RNTI on every BL/CE downlink subframe except when in DRX.

If the UE decodes
  a PDCCH with DCI format 1A/1B/1D/1/2A/2/2B/2C/2D or
  an EPDCCH with DCI format 1A/1B/1D/1/2A/2/2B/2C/2D or
  an MPDCCH with DCI format 6-1A
  for the primary cell and the corresponding detected RNTI equals the C-RNTI or SPS C-RNTI of the UE and the TPC field in the DCI format is not used to determine the PUCCH resource as in subclause 10.1, the UE shall use the $\delta_{PUCCH}$ provided in that PDCCH/EPDCCH/MPDCCH.

Else
  if the UE decodes a PDCCH/MPDCCH with DCI format 3/3A, the UE shall use the $\delta_{PUCCH}$ provided in that PDCCH/MPDCCH
  else the UE shall set $\delta_{PUCCH}=0$ dB.

$$g(i) = g(i-1) + \sum_{m=0}^{M-1} \delta_{PUCCH}(i-k_m)$$

where g(i) is the current PUCCH power control adjustment state and where g(0) is the first value after reset.
  For FDD or FDD-TDD and primary cell frame structure type 1, $M=1$ and $k_0=4$.
  For TDD, values of M and $k_m$ are given in Table 10.1.3.1-1, where the "UL/DL configuration" in Table 10.1.3.1-1 corresponds to the einna-HARQ-ReferenceConfig-r12 for the primary cell when the UE is configured with the parameter EIMTA-MainConfigServCell-r12 for the primary cell.
  The $\delta_{PUCCH}$ dB values signalled on PDCCH with DCI format 1A/1B/1D/1/2A/2/2B/2C/2D or EPDCCH with DCI format 1A/1B/1D/1/2A/2/2B/2C/2D or MPDCCH with DCI format 6-1A are given in Table 5.1.2.1-1. If the PDCCH with DCI format 1/1A/2/2A/2B/2C/2D or EPDCCH with DCI format 1/1A/2A/2/2B/2C/2D or MPDCCH with DCI format 6-1A is validated as an SPS activation PDCCH/EPDCCH/MPDCCH, or the PDCCH/EPDCCH with DCI format 1A or MPDCCH with DCI format 6-1A is validated as an SPS release PDCCH/EPDCCH/MPDCCH, then $\delta_{PUCCH}$ is 0 dB.

The $\delta_{PUCCH}$ dB values signalled on PDCCH/MPDCCH with DCI format 3/3A are given in Table 5.1.2.1-1 or in Table 5.1.2.1-2 as semi-statically configured by higher layers.

If $P_{O\_UE\_PUCCH}$ value is changed by higher layers, $g(0)=0$

Else $g(0)=\Delta P_{rampup}+\delta_{msg2}$, where $\delta_{msg2}$ is the TPC command indicated in the random access response corresponding to the random access preamble transmitted in the primary cell, see subclause 6.2 and if UE is transmitting PUCCH in subframe $$\Delta P_{rampup} = \min\left[\left\{\max\left(0, P_{CMAX,c} - \begin{pmatrix}P_{0\_PUCCH} + \\ PL_c + h(n_{CQI},n_{HARQ},n_{SR}) + \\ \Delta_{F\_PUCCH}(F) + \Delta_{TxD}(F')\end{pmatrix}\right)\right\}, \Delta P_{rampuprequested}\right].$$

Otherwise, $\Delta P_{rampup}=\min[\{\max(0,P_{CMAX,c}-(P_{0\_PUCCH}+PL_c))\}, \Delta P_{rampuprequested}]$ and rampuprequested $\Delta P_{rampuprequested}$ is provided by higher layers and corresponds to the total power ramp-up requested by higher layers from the first to the last preamble in the primary cell.

If UE has reached $P_{CMAX,c}(i)$ for the primary cell, positive TPC commands for the primary cell shall not be accumulated.

If UE has reached minimum power, negative TPC commands shall not be accumulated.

UE shall reset accumulation
- when $P_{O\_UE\_PUCCH}$ value is changed by higher layers
- when the UE receives a random access response message for the primary cell $g(i)=g(i-1)$ if i is not an uplink subframe in TDD or FDD-TDD and primary cell frame structure type 2.

For a BL/CE UE configured with CEModeA, if the PUCCH is transmitted in more than one subframe $i_0, i_1, \ldots, i_{N-1}$ where $i_0<i_1<\ldots<i_{N-1}$, the PUCCH transmit power in subframe $i_k$ k=0, 1, ..., N-1 is determined by $P_{PUCCH,c}(i_k)=P_{PUCCH,c}(i_0)$ For a BL/CE UE configured with CEModeB, the PUCCH transmit power in subframe $i_k$ is determined by $P_{PUCCH,c}(i_k)=P_{CMAX,c}(i_0)$ FIG. 9 (a reproduction of Table 5.1.2.1-1 from 3GPP TS 36.213 v13.3.0)

FIG. 10 (a reproduction of Table 5.1.2.1-2 from 3GPP TS 36.213 v13.3.0)

5.1.3 Sounding Reference Symbol (SRS)

5.1.3.1 UE Behaviour

The setting of the UE Transmit power $P_{SRS}$ for the SRS transmitted on subframe i for serving cell c is defined by $P_{SRS,c}(i)=\{P_{CMAX,c}(i), P_{SRS\_OFFSET,c}(m)+10\log_{10}(M_{SRS,c})+P_{O\_PUSCH,c}(j)+\alpha_c(j)\cdot PL_c+f_c(i)\}[dBm]$ where $P_{CMAX,c}(i)$ is the configured UE transmit power defined in [6] in subframe i for serving cell c.

$P_{SRS\_OFFSET,c}(m)$ is semi-statically configured by higher layers for m=0 and m=1 for serving cell c. For SRS transmission given trigger type 0 then m=0 and for SRS transmission given trigger type 1 then m=1.

$M_{SRS,c}$ is the bandwidth of the SRS transmission in subframe i for serving cell c expressed in number of resource blocks.

$f_c(i)$ is the current PUSCH power control adjustment state for serving cell c, see subclause 5.1.1.1.

$P_{O\_PUSCH,c}(j)$ and $\alpha_c(j)$ are parameters as defined in subclause 5.1.1.1 for subframe i, where j=1.

If the UE is not configured with an SCG or a PUCCH-SCell, and if the total transmit power of the UE for the Sounding Reference Symbol in an SC-FDMA symbol would exceed $\hat{P}_{CMAX}(i)$, the UE scales $\hat{P}_{SRS,c}(i)$ for the serving cell c and the SC-FDMA symbol in subframe i such that the condition $$\sum_c w(i)\cdot \hat{P}_{SRS,c}(i) \leq \hat{P}_{CMAX}(i)$$

is satisfied where $\hat{P}_{SRS,c}(i)$ is the linear value of $\hat{P}_{SRS,c}(i)$, $\hat{P}_{CMAX}(i)$ is the linear value of $P_{CMAX}$ defined in [6] in subframe i and w(i) is a scaling factor of $\hat{P}_{SRS,c}(i)$ for serving cell c where $0<w(i)\leq 1$. Note that w(i) values are the same across serving cells.

If the UE is not configured with an SCG or a PUCCH-SCell, and if the UE is configured with multiple TAGs and the SRS transmission of the UE in an SC-FDMA symbol for a serving cell in subframe i in a TAG overlaps with the SRS transmission in another SC-FDMA symbol in subframe i for a serving cell in another TAG, and if the total transmit power of the UE for the Sounding Reference Symbol in the overlapped portion would exceed $\hat{P}_{CMAX}(i)$, the UE scales $\hat{P}_{SRS,c}(i)$ for the serving cell c and each of the overlapped SRS SC-FDMA symbols in subframe i such that the condition $$\sum_c w(i)\cdot \hat{P}_{SRS,c}(i) \leq \hat{P}_{CMAX}(i)$$

is satisfied where $\hat{P}_{SRS,c}(i)$ is the linear value of $P_{SRS,c}(i)$, $\hat{P}_{CMAX}(i)$ is the linear value of $P_{CMAX}$ defined in [6] in subframe i and w(i) is a scaling factor of $\hat{P}_{SRS,c}(i)$ for serving cell c where $0<w(i)\leq 1$. Note that w(i) values are the same across serving cells.

If the UE is configured with higher layer parameter UplinkPowerControlDedicated-v12x0 for serving cell c and if subframe i belongs to uplink power control subframe set 2 as indicated by the higher layer parameter tpc-SubframeSet-r12, the UE shall use $f_{c,2}(i)$ instead of $f_c(i)$ to determine $P_{SRS,c}(i)$ for subframe i and serving cell c, where $f_{c,2}(i)$ is defined in subclause 5.1.1.1.

In LTE, as discussed in 3GPP TS 36.213 v13.3.0, uplink channels and/or signals may be transmitted in the same subframe and/or symbol. In order to pertain single carrier property, multiplexing or dropping mechanism are designed. In LTE-A, the uplink channels and/or signals may be transmitted in the same subframe and/or symbol on different carriers. Multiple simultaneous uplink transmissions may induce power exceeding maximum value. Some power handling will be performed, for instance power scaling with priority consideration, multiplexing and dropping.

7.2 UE Procedure for Reporting Channel State Information (CSI)

If the UE is configured with a PUCCH-SCell, the UE shall apply the procedures described in this clause for both primary PUCCH group and secondary PUCCH group unless stated otherwise When the procedures are applied for the primary PUCCH group, the terms 'secondary cell', 'secondary cells', 'serving cell', and 'serving cells' in this clause refer to secondary cell, secondary cells, serving cell or serving cells belonging to the primary PUCCH group respectively unless stated otherwise.

When the procedures are applied for secondary PUCCH group, the terms 'secondary cell', 'secondary cells', 'serving cell' and 'serving cells' in this clause refer to secondary cell, secondary cells (not including the PUCCH-SCell), serving cell, serving cells belonging to the secondary PUCCH group respectively unless stated otherwise. The term 'primary cell' in this clause refers to the PUCCH-SCell of the secondary PUCCH group.

The time and frequency resources that can be used by the UE to report CSI which consists of Channel Quality Indicator (CQI), precoding matrix indicator (PMI), precoding type indicator (PTI), CSI-RS resource indicator (CRI), and/or rank indication (RI) are controlled by the eNB. For spatial multiplexing, as given in [3], the UE shall determine a RI corresponding to the number of useful transmission layers. For transmit diversity as given in [3], RI is equal to one.

A non-BL/CE UE in transmission mode 8 or 9 is configured with or without PMI/RI reporting by the higher layer parameter pini-RI-Report.

A UE in transmission mode 10 can be configured with one or more CSI processes per serving cell by higher layers.

For a UE in transmission mode 10,

If a UE is not configured with higher layer parameter eMIMO-Type, each CSI process is associated with a CSI-RS resource (defined in subclause 7.2.5) and a CSI-interference measurement (CSI-IM) resource (defined in subclause 7.2.6). A UE can be configured with up to two CSI-IM resources for a CSI process if the UE is configured with CSI subframe sets $c_{CSI,0}$ and $c_{CSI,1}$ by the higher layer parameter csi-SubFramePattern-Config-r12 for the CSI process.

If the UE is configured with higher layer parameter eMIMO-Type, and eMIMO-Type is set to 'CLASS A', each CSI process is associated with a CSI-RS resource (defined in subclause 7.2.5) and a CSI-interference measurement (CSI-IM) resource (defined in subclause 7.2.6). A UE can be configured with up to two CSI-IM resources for a CSI process if the UE is configured with CSI subframe sets $c_{CSI,0}$ and $c_{CSI,1}$ by the higher layer parameter csi-SubFramePatternConfig-r12 for the CSI process.

If the UE is configured with higher layer parameter eMIMO-Type, and eMIMO-Type is set to 'CLASS B', each CSI process is associated with one or more CSI-RS resource (defined in subclause 7.2.5) and one or more CSI-interference measurement (CSI-IM) resource (defined in subclause 7.2.6). Each CSI-RS resource is associated with a CSI-IM resource by higher layers. For a CSI process with one CSI-RS resource, a UE can be configured with CSI-IM resource for each CSI subframe sets if the UE is configured with CSI subframe sets $c_{CSI,0}$ and $c_{CSI,1}$ by the higher layer parameter csi-SubFramePatternConfig-r12 for the CSI process.

For a UE in transmission mode 10, a CSI reported by the UE corresponds to a CSI process configured by higher layers. Each CSI process can be configured with or without PMI/RI reporting by higher layer signalling.

For UE in transmission mode 9 and the UE configured with higher layer parameter eMIMO-Type, the term 'CSI process' in this subclause refers to the CSI configured for the UE.

For a UE in transmission mode 9, and if the UE is configured with higher layer parameter eMIMO-Type, and, eMIMO-Type is set to 'CLASS A', each CSI process is associated with a CSI-RS resource (defined in subclause 7.2.5).

eMIMO-Type is set to 'CLASS B', each CSI process is associated with one or more CSI-RS resource (defined in subclause 7.2.5).

For a CSI process, and if a UE is configured in transmission mode 9 or 10, and UE is not configured with higher layer parameter pini-RI-Report, and UE is configured with higher layer parameter eMIMO-Type, and eMIMO-Type is set to 'CLASS B', and the number of CSI-RS antenna ports in at least one of the one or more configured CSI-RS resource is more than one, the UE is considered to be configured without PMI reporting.

A UE is configured with resource-restricted CSI measurements if the subframe sets $c_{CSI,0}$ and $C_{CSI,1}$ are configured by higher layers.

For a serving cell with frame structure type 1, a UE is not expected to be configured with csi-SubframePatternConfig-r12.

CSI reporting is periodic or aperiodic.

A BL/CE UE configured with CEModeB is not expected to be configured with either aperiodic CSI or periodic CSI reporting.

If the UE is configured with more than one serving cell, it transmits CSI for activated serving cell(s) only.

If a UE is not configured for simultaneous PUSCH and PUCCH transmission, it shall transmit periodic CSI reporting on PUCCH as defined hereafter in subframes with no PUSCH allocation.

If a UE is not configured for simultaneous PUSCH and PUCCH transmission, it shall transmit periodic CSI reporting on PUSCH of the serving cell with smallest ServCellIndex as defined hereafter in subframes with a PUSCH allocation, where the UE shall use the same PUCCH-based periodic CSI reporting format on PUSCH.

A UE shall transmit aperiodic CSI reporting on PUSCH if the conditions specified hereafter are met. For aperiodic CQI/PMI reporting, RI reporting is transmitted only if the configured CSI feedback type supports RI reporting.

8.2 UE Sounding Procedure

If the UE is configured with a PUCCH-SCell, the UE shall apply the procedures described in this clause for both primary PUCCH group and secondary PUCCH group unless stated otherwise When the procedures are applied for the primary PUCCH group, the terms 'secondary cell', 'secondary cells', 'serving cell', and 'serving cells' in this clause refer to secondary cell, secondary cells, serving cell or serving cells belonging to the primary PUCCH group respectively unless stated otherwise.

When the procedures are applied for secondary PUCCH group, the terms 'secondary cell', 'secondary cells', 'serving cell' and 'serving cells' in this clause refer to secondary cell, secondary cells (not including the PUCCH-SCell), serving cell, serving cells belonging to the secondary PUCCH group respectively unless stated otherwise. The term 'primary cell' in this clause refers to the PUCCH-SCell of the secondary PUCCH group.

A UE shall transmit Sounding Reference Symbol (SRS) on per serving cell SRS resources based on two trigger types:

trigger type 0: higher layer signalling
trigger type 1: DCI formats 0/4/1A/6-0A/6-1A for FDD and TDD and DCI formats 2B/2C/2D for TDD.

In case both trigger type 0 and trigger type 1 SRS transmissions would occur in the same subframe in the same serving cell, the UE shall only transmit the trigger type 1 SRS transmission.

A UE may be configured with SRS parameters for trigger type 0 and trigger type 1 on each serving cell. A BL/CE UE configured with CEModeB is not expected to be configured with SRS parameters for trigger type 0 and trigger type 1. The following SRS parameters are serving cell specific and semi-statically configurable by higher layers for trigger type 0 and for trigger type 1.

Number of combs $K_{TC}$ as defined in subclause 5.5.3.2 of [3] for trigger type 0 and each configuration of trigger type 1, if configured srs-UpPtsAdd: two or four additional SC-FDMA symbols in UpPTS as defined in [11] for trigger type 0 and trigger type 1, if configured Transmission comb $\bar{k}_{TC}$, as defined in subclause 5.5.3.2 of [3] for trigger type 0 and each configuration of trigger type 1

Starting physical resource block assignment $n_{RRC}$, as defined in subclause 5.5.3.2 of [3] for trigger type 0 and each configuration of trigger type 1 duration: single or indefinite (until disabled), as defined in [11] for trigger type 0 srs-ConfigIndex $I_{SRS}$ for SRS periodicity $T_{SR}$, and SRS subframe offset $T_{offset}$, as defined in Table 8.2-1 and Table 8.2-2 for trigger type 0 and SRS periodicity $T_{SRS,1}$ and SRS subframe offset $T_{offset,1}$ as defined in Table 8.2-4 and Table 8.2-5 trigger type 1

SRS bandwidth $B_{SRS}$, as defined in subclause 5.5.3.2 of [3] for trigger type 0 and each configuration of trigger type 1

Frequency hopping bandwidth, $b_{hop}$, as defined in subclause 5.5.3.2 of [3] for trigger type 0

Cyclic shift $n_{SRS}^{cs}$, as defined in subclause 5.5.3.1 of [3] for trigger type 0 and each configuration of trigger type 1

Number of antenna ports $N_p$ for trigger type 0 and each configuration of trigger type 1

For trigger type 0, if SoundingRS-UL-ConfigDedicatedUpPTsExt is configured, the SRS parameters in SoundingRS-UL-ConfigDedicatedUpPTsExt shall be used; otherwise, SoundingRS-UL-ConfigDedicated shall be used.

For trigger type 1, if SoundingRS-UL-ConfigDedicatedAperiodicUpPTsExt is configured, the SRS parameters in SoundingRS-UL-ConfigDedicatedAperiodicUpPTsExt shall be used; otherwise, SoundingRS-UL-ConfigDedicatedAperiodic shall be used.

For trigger type 1 and DCI format 4 three sets of SRS parameters, srs-ConfigApDCI-Format4, are configured by higher layer signalling. The 2-bit SRS request field [4] in DCI format 4 indicates the SRS parameter set given in Table 8.1-1. For trigger type 1 and DCI format 0/6-0A, a single set of SRS parameters, srs-ConfigApDCI-Format0, is configured by higher layer signalling. For trigger type 1 and DCI formats 1A/2B/2C/2D/6-1A, a single common set of SRS parameters, srs-ConfigApDCI-Format1a2b2c, is configured by higher layer signalling. The SRS request field is 1 bit [4] for DCI formats 0/1A/2B/2C/2D/6-0A/6-1A, with a type 1 SRS triggered if the value of the SRS request field is set to '1'.

A 1-bit SRS request field shall be included in DCI formats 0/1A for frame structure type 1 and 0/1A/2B/2C/2D for frame structure type 2 if the UE is configured with SRS parameters for DCI formats 0/1A/2B/2C/2D by higher-layer signalling. A 1-bit SRS request field shall be included in DCI formats 6-0A/6-1A, the value of which is reserved if the UE is not configured with SRS parameters for DCI formats 6-0A/6-1A by higher layer signalling.

FIG. 11 is a reproduction of Table 8.1-1 from 3GPP TS 36.213 v13.3.0.

The serving cell specific SRS transmission bandwidths $C_{SRS}$ are configured by higher layers. The allowable values are given in subclause 5.5.3.2 of [3].

The serving cell specific SRS transmission sub-frames are configured by higher layers. The allowable values are given in subclause 5.5.3.3 of [3].

For a TDD serving cell, SRS transmissions can occur in UpPTS and uplink subframes of the UL/DL configuration indicated by the higher layer parameter subframeAssignment for the serving cell.

When closed-loop UE transmit antenna selection is enabled for a given serving cell for a UE that supports transmit antenna selection, the index $a(n_{SRS})$, of the UE antenna that transmits the SRS at time $n_{SRS}$ is given by $a(n_{SRS})=n_{SRS}$ mod 2, for both partial and full sounding bandwidth, and when frequency hopping is disabled (i.e., $b_{hop} \geq B_{SRS}$), $$a(n_{SRS}) = \begin{cases} (n_{SRS} + \lfloor n_{SRS}/2 \rfloor + \beta \cdot \lfloor n_{SRS}/K \rfloor) \bmod 2 & \text{when } K \text{ is even} \\ n_{SRS} \bmod 2 & \text{when } K \text{ is odd} \end{cases},$$

$$\beta = \begin{cases} 1 & \text{where } K \bmod 4 = 0 \\ 0 & \text{otherwise} \end{cases}$$

when frequency hopping is enabled (i.e., $b_{hop} < B_{SRS}$)' where values $B_{SRS}$, $b_{hop}$, $N_b$, and $n_{SRS}$ are given in subclause 5.5.3.2 of [3], and $$K = \prod_{b'=b_{hop}}^{B_{SRS}} N_{b'}$$

(where $N_b$, =1 regardless of the $N_b$ value), except when a single SRS transmission is configured for the UE. If a UE is configured with more than one serving cell, the UE is not expected to transmit SRS on different antenna ports simultaneously.

A UE may be configured to transmit SRS on $N_R$ antenna ports of a serving cell where $N_R$ may be configured by higher layer signalling. For PUSCH transmission mode 1 $N_R \in \{0,1,2,4\}$ and for PUSCH transmission mode 2 $N_p \in \{0,1,2\}$ with two antenna ports configured for PUSCH and $N_p \in \{0,1,4\}$ with 4 antenna ports configured for PUSCH. A UE configured for SRS transmission on multiple antenna ports of a serving cell shall transmit SRS for all the configured transmit antenna ports within one SC-FDMA symbol of the same subframe of the serving cell.

The SRS transmission bandwidth and starting physical resource block assignment are the same for all the configured antenna ports of a given serving cell. The UE does not support a value of $K_{TC}$ set to '4', if the UE is configured for SRS transmission on 4 antenna ports of a serving cell.

If a UE is not configured with multiple TAGs and the UE not is configured with the parameter srs-UpPtsAdd for trigger type 1, or if a UE is not configured with multiple TAGs and the UE is not configured with more than one serving cell of different CPs, the UE shall not transmit SRS in a symbol whenever SRS and PUSCH transmissions happen to overlap in the same symbol.

For TDD serving cell, and UE not configured with additional SC-FDMA symbols in UpPTS, when one SC-FDMA symbol exists in UpPTS of the given serving cell, it can be used for SRS transmission, when two SC-FDMA symbols exist in UpPTS of the given serving cell, both can be used for SRS transmission and for trigger type 0 SRS both can be assigned to the same UE. For TDD serving cell, and if the UE is configured with two or four additional SC-FDMA symbols in UpPTS of the given serving cell, all can be used for SRS transmission and for trigger type 0 SRS at most two SC-FDMA symbols out of the configured additional SC-FDMA symbols in UpPTS can be assigned to the same UE.

If a UE is not configured with multiple TAGs and the UE not is configured with the parameter srs-UpPtsAdd for trigger type 1, or if a UE is not configured with multiple TAGs and the UE is not configured with more than one serving cell of different CPs, or if a UE is configured with multiple TAGs and SRS and PUCCH format 2/2a/2b happen to coincide in the same subframe in the same serving cell, The UE shall not transmit type 0 triggered SRS whenever type 0 triggered SRS and PUCCH format 2/2a/2b transmissions happen to coincide in the same subframe;

The UE shall not transmit type 1 triggered SRS whenever type 1 triggered SRS and PUCCH format 2a/2b or format 2 with HARQ-ACK transmissions happen to coincide in the same subframe;

The UE shall not transmit PUCCH format 2 without HARQ-ACK whenever type 1 triggered SRS and PUCCH format 2 without HARQ-ACK transmissions happen to coincide in the same subframe.

If a UE is not configured with multiple TAGs and the UE not is configured with the parameter srs-UpPtsAdd for trigger type 1, or if a UE is not configured with multiple TAGs and the UE is not configured with more than one serving cell of different CPs, or if a UE is configured with multiple TAGs and SRS and PUCCH happen to coincide in the same subframe in the same serving cell, The UE shall not transmit SRS whenever SRS transmission and PUCCH transmission carrying HARQ-ACK and/or positive SR happen to coincide in the same subframe if the parameter ackNackSRS-SimultaneousTransmission is FALSE;

For FDD-TDD and primary cell frame structure 1, the UE shall not transmit SRS in a symbol whenever SRS transmission and PUCCH transmission carrying HARQ-ACK and/or positive SR using shortened format as defined in subclauses 5.4.1, 5.4.2A, 5.4.2B, and 5.4.2C of [3] happen to overlap in the same symbol if the parameter ackNackSRS-SimultaneousTransmission is TRUE.

Unless otherwise prohibited, the UE shall transmit SRS whenever SRS transmission and PUCCH transmission carrying HARQ-ACK and/or positive SR using shortened format as defined in subclauses 5.4.1 and 5.4.2A of [3] happen to coincide in the same subframe if the parameter ackNackSRS-SimultaneousTransmission is TRUE.

If a UE is not configured with multiple TAGs and the UE not is configured with the parameter srs-UpPtsAdd for trigger type 1, or if a UE is not configured with multiple TAGs and the UE is not configured with more than one serving cell of different CPs, the UE shall not transmit SRS whenever SRS transmission on any serving cells and PUCCH transmission carrying HARQ-ACK and/or positive SR using normal PUCCH format as defined in subclauses 5.4.1 and 5.4.2A of [3] happen to coincide in the same subframe.

In UpPTS, whenever SRS transmission instance overlaps with the PRACH region for preamble format 4 or exceeds the range of uplink system bandwidth configured in the serving cell, the UE shall not transmit SRS.

The parameter ackNackSRS-SimultaneousTransmission provided by higher layers determines if a UE is configured to support the transmission of HARQ-ACK on PUCCH and SRS in one subframe. If it is configured to support the transmission of HARQ-ACK on PUCCH and SRS in one subframe, then in the cell specific SRS subframes of the primary cell, if the UE transmits PUCCH format 1/1a/1b/3, the UE shall transmit HARQ-ACK and SR using the shortened PUCCH format as defined in subclauses 5.4.1 and 5.4.2A of [3], where the HARQ-ACK or the SR symbol corresponding to the SRS location is punctured.

If the UE transmits PUCCH format 4/5 partly or fully overlapping with the cell specific SRS bandwidth in the cell specific SRS subframes of the primary cell, then UE shall transmit UCI using the shortened PUCCH format as defined in subclauses 5.4.2B and 5.4.2C of [3].

For PUCCH format 1/1a/1b/3, this shortened PUCCH format shall be used in a cell specific SRS subframe of the primary cell even if the UE does not transmit SRS in that subframe. For PUCCH format 4/5, this shortened PUCCH format shall be used if the PUCCH transmission partly or fully overlaps with the cell-specific SRS bandwidth in the cell specific SRS subframes of the primary cell even if the UE does not transmit SRS in that subframe. The cell specific SRS subframes are defined in subclause 5.5.3.3 of [3]. Otherwise, the UE shall use the normal PUCCH format 1/1a/1b as defined in subclause 5.4.1 of [3] or normal PUCCH format 3 as defined in subclause 5.4.2A or normal PUCCH format 4 as defined in subclause 5.4.2B or normal PUCCH format 5 as defined in subclause 5.4.2C of [3].

For a BL/CE UE, for a SRS transmission in subframe n and if the UE transmits PUSCH/PUCCH in subframe n and/or n+1, the UE shall not transmit the SRS in subframe n if the SRS transmission bandwidth in subframe n is not completely within the narrowband of PUSCH/PUCCH in subframe n and/or n+1

A BL/CE UE shall not transmit SRS in UpPTS if SRS frequency location is different from DwPTS reception narrowband in the same special subframe.

As disclosed herein, physical layer procedures for beamforming require multi-beam based approaches. The eNB performs beamforming to overcome the higher pathloss in higher frequencies. At one time or one symbol time, the eNB generates a portion of the eNB beams instead of all eNB beams due to the limit of analog or hybrid beamforming. For transmission scheduling, the eNB requires the beam information of a UE such as, for example, which eNB beams are qualified for the UE. An eNB beam with a qualified channel quality may be the beam with Reference Signal Received Power (RSRP) or Signal to Interference plus Noise Ratio (SINR) larger than some threshold. Alternatively, an eNB beam with a qualified channel quality may be the beam with a pathloss smaller than some threshold. In another alternative embodiment, the eNB beam with a qualified channel quality may mean the beam with the RSRP, SINR, or Pathloss (PL) (absolute) difference smaller than some threshold as compared to the eNB beam with the best channel quality. The eNB may perform beam sweeping on Sound Reference Signal (SRS) to get the qualified eNB beam information of a UE. Alternatively, a UE can perform eNB beam measurement, and the UE then reports the qualified eNB beam information to the eNB. Similarly, the UE may possibly have the capability to perform beamforming (e.g. to form UE beam(s)) to get more power gain.

As disclosed herein, it may be assumed that a UE has capability limitation on the number of simultaneously generated UE beam(s). Furthermore, there may be multiple Transmission/Reception Points (TRPs) or multiple network beams to serve the UE. It may be possible that simultaneously generated UE beams of the UE cannot satisfy scheduling and transmission/reception from the multiple TRPs or multiple beams. For instance, a UE may be able to generate a maximum of one UE beam at one time. If the UE performs transmission on a UE beam $B_{UE,x}$, the transmission can be received by a TRP X or received on a TRP beam $B_x$. If the UE performs transmission on a UE beam $B_{UE,y}$, the transmission can be received by a TRP Y or received on a TRP beam $B_y$. However, it may be possible that the UE is scheduled to transmit data transmission on a UE $B_{UE,x}$ in a time unit, wherein the UE is configured/scheduled to transmit Channel State Information (CSI) reporting on a UE beam $B_{UE,y}$. This scenario will result in a problem because the UE (in this example) is not capable of generating a UE beam $B_{UE,x}$ and UE beam $B_{UE,y}$ simultaneously.

More generally, a UE is configured and/or scheduled to perform a first transmission or reception on a first UE beam in a first time unit, and the UE is configured and/or scheduled to perform a second transmission or reception on a second UE beam in a second time unit. The time unit may be a slot or a mini-slot. In the case where the second time unit is at least partially overlapping with the first time unit, there are some approaches to address the situation if the UE is not capable to generate the first UE beam and the second UE beam simultaneously.

In one embodiment, which will be referred to as "Alt. a", the UE performs a first transmission or reception on a first UE beam, and the UE drops the second transmission or reception on a second UE beam. In one embodiment, the starting time of the second transmission or reception is later than the starting time of the first transmission or reception. Alternatively, the second transmission or reception has a lower priority than the first transmission or reception. The priority may be determined based on one or more factor(s) which may be Quality of Service (QoS) information, beam priority, channel quality of beam, channel type, signal type, and/or information type delivered in the transmission or reception. In one embodiment, a primary beam could have a higher priority than a secondary beam. A beam with the better channel quality could have higher priority than a beam with worse channel quality. A beam with the best channel quality could have a higher priority than other beams. A control channel could have a higher priority than a data channel. Control information could have a higher priority than data (information). A scheduling request could have a higher priority than Hybrid Automatic Repeat Request Acknowledgement (HARQ-ACK). HARQ-ACK could have a higher priority than CSI reporting. Data, SR, HARQ-ACK, and/or CSI could have a higher priority than a signal for channel measurement. A signal for beam management could have a higher priority than a signal for channel measurement. A signal for beam management could have higher priority than data (information). A signal for beam management could have a higher priority than a Scheduling Request (SR). A signal for beam management could have a higher priority than HARQ-ACK. A signal for beam management could have a higher priority than CSI.

In another embodiment, which will be referred to as "Alt. b", the UE performs the first transmission or reception and the second transmission or reception on the first UE beam, wherein the first transmission or reception and the second transmission or reception are performed on different channels or different signals. In other words, the second transmission or reception is switched from the second UE beam to the first UE beam. In one embodiment, the second transmission or reception on the first UE beam is performed on the same channel or the same signal as when the second transmission or reception is performed on the second UE beam. In another embodiment, the transmit power of the second transmission may be re-determined when the second transmission is switched from the second UE beam to the first UE beam. The transmit power re-determination of the second transmission takes the transmit power of the first transmission into account. It may be assumed that multiple TPRs or multiple TRP beams reserve the same channel or the same signal resource for the switched second transmission. In one embodiment, the starting time of the second transmission or reception is later than the starting time of the first transmission or reception. In one alternative, the first transmission or reception is data transmission or reception, and the second transmission/reception is neither data transmission nor data reception. The second transmission or reception may be a HARQ-ACK or CSI. In one alternative, the first transmission or reception is a signal for beam management, and the second transmission or reception is not signal for beam management. The second transmission or reception may be any of following: SR, HARQ-ACK and CSI. In one alternative, the second transmission or reception does not include data transmission and reception. This means that the data transmission or reception cannot be switched from the second UE beam to the first UE beam. In one alternative, the second transmission or reception does not include a signal for beam management. This means that the signal for beam management cannot be switched from the second UE beam to the first UE beam. In one alternative, the second transmission or reception does not include a signal for channel measurement. This means that the signal for channel measurement cannot be switched from the second UE beam to the first UE beam.

In one embodiment, which will be referred to as "Alt. c", the UE performs the first transmission or reception and the second transmission or reception on the first UE beam, wherein the first transmission or reception and the second transmission or reception are performed on the same channel or the same signal. In one alternative, the first transmission or reception and the second transmission or reception are multiplexed on the same channel or signal. Alternatively, the first transmission or reception and the second transmission or reception are bundled on the same channel or signal. In other words, the second transmission or reception is switched from the second UE beam to the first UE beam. In one alternative, the second transmission or reception is performed on the channel or the signal of the first transmission or reception. For example, the first transmission or reception is a data transmission or reception, and the second transmission or reception is neither a data transmission nor a data reception. The second transmission or reception may be a HARQ-ACK or CSI. In one embodiment, the first transmission or reception is a signal for beam management, and the second transmission or reception may not be any of data, SR, HARQ-ACK, CSI, a signal for channel measurement, or a signal for beam management. In one embodiment, the first transmission or reception is a signal for channel measurement, and the second transmission or reception may not be any of data, SR, HARQ-ACK, CSI, a signal for channel measurement, or a signal for beam management. In one embodiment, the second transmission or reception does not include data transmission and reception. This means that data transmission or reception cannot be switched from the second UE beam to the first UE beam. In another embodiment, the second transmission or reception does not include a signal for beam management. This means that the signal for beam management cannot be switched from the second UE beam to the first UE beam. In one embodiment, the second transmission or reception does not include a signal for channel measurement. This means that the signal for channel measurement cannot be switched from the second UE beam to the first UE beam.

The first transmission or reception may be any of the following: data, SR, HARQ-ACK, CSI, a signal for channel measurement, and a signal for beam management. The second transmission or reception may be any of the following: data, SR, HARQ-ACK, CSI, a signal for channel measurement, and a signal for beam management. FIG. 12 illustrates some of the possible alternatives for dealing with different situations of the first transmission or reception and the second transmission or reception. The "X" shown in FIG. 12 could mean that the situation does not apply to any approach of Alt.a, Alt. b and Alt.c. The "X" shown in FIG. 12 could mean that the situation can be avoided via network scheduling and/or coordination.

Figure 13:
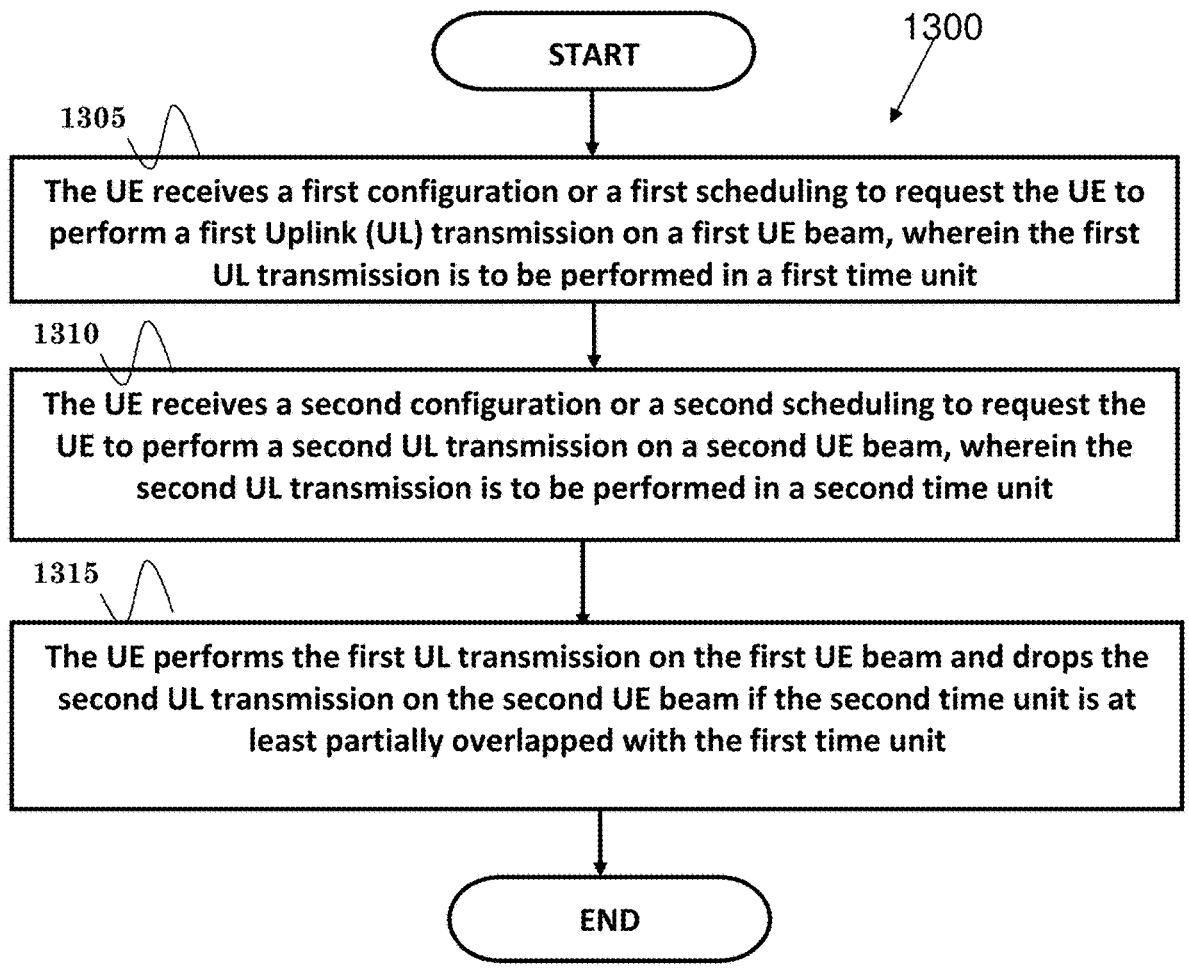
FIG. 13 is a flow diagram for one exemplary embodiment from the perspective of a user equipment (UE).

FIG. 13 is a flow chart 1300 according to one exemplary embodiment from the perspective of a UE. In step 1305, the UE receives a first configuration or a first scheduling to request the UE to perform a first UL transmission on a first UE beam, wherein the first UL transmission is to be performed in a first time unit. In step 1310, the UE receives a second configuration or a second scheduling to request the UE to perform a second UL transmission on a second UE beam, wherein the second UL transmission is to be performed in a second time unit. In step 1315, the UE performs the first UL transmission on the first UE beam and drops the second UL transmission on the second UE beam if the second time unit is at least partially overlapped with the first time unit.

Figure 14:
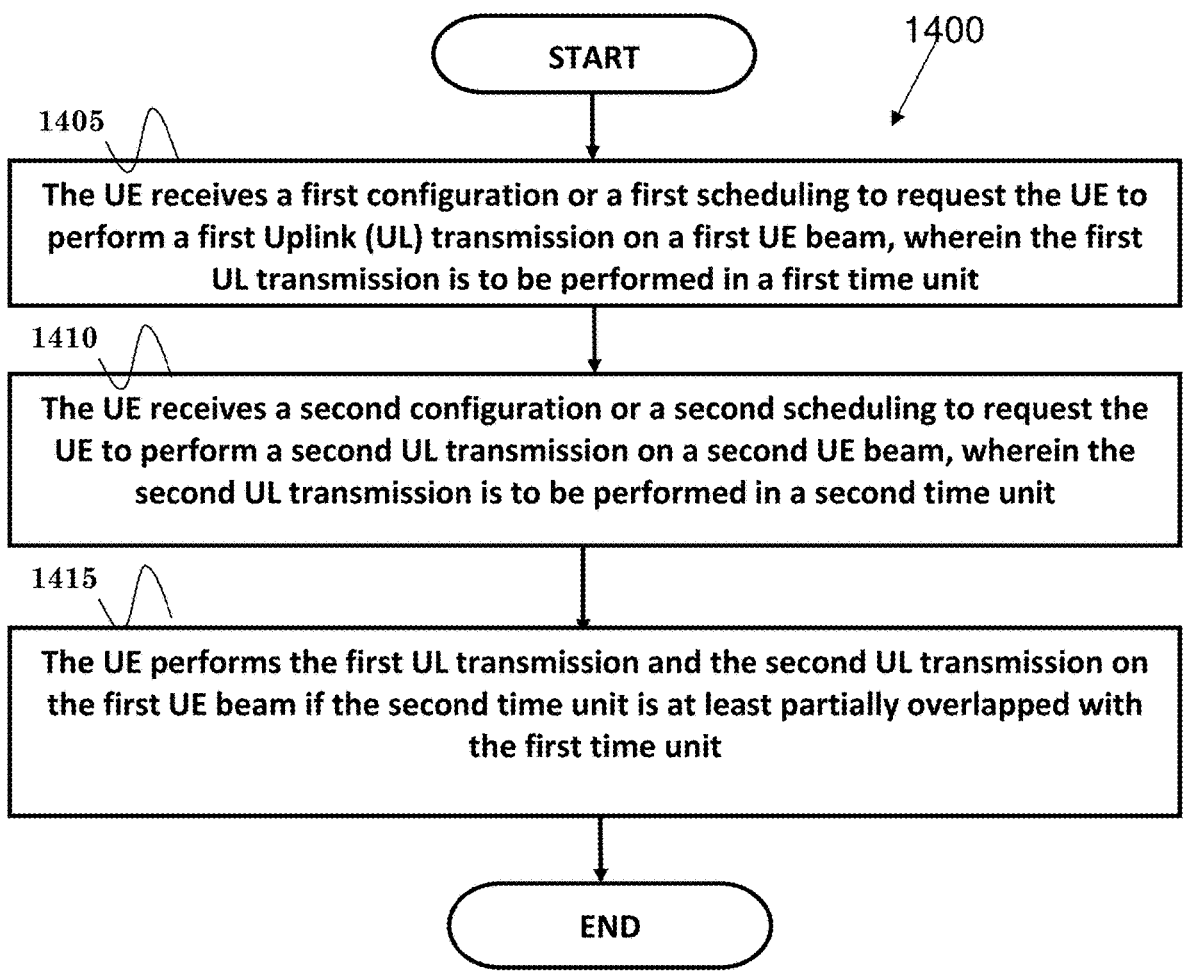
FIG. 14 is a flow diagram for another exemplary embodiment from the perspective of a UE.

FIG. 14 is a flow chart 1400 according to one exemplary embodiment from the perspective of a UE. In step 1405, the UE receives a first configuration or a first scheduling to request the UE to perform a first UL transmission on a first UE beam, wherein the first UL transmission is to be performed in a first time unit. In step 1410, the UE receives a second configuration or a second scheduling to request the UE to perform a second UL transmission on a second UE beam, wherein the second UL transmission is to be performed in a second time unit. In step 1415, the UE performs the first UL transmission and the second UL transmission on the first UE beam if the second time unit is at least partially overlapped with the first time unit.

Figure 15:
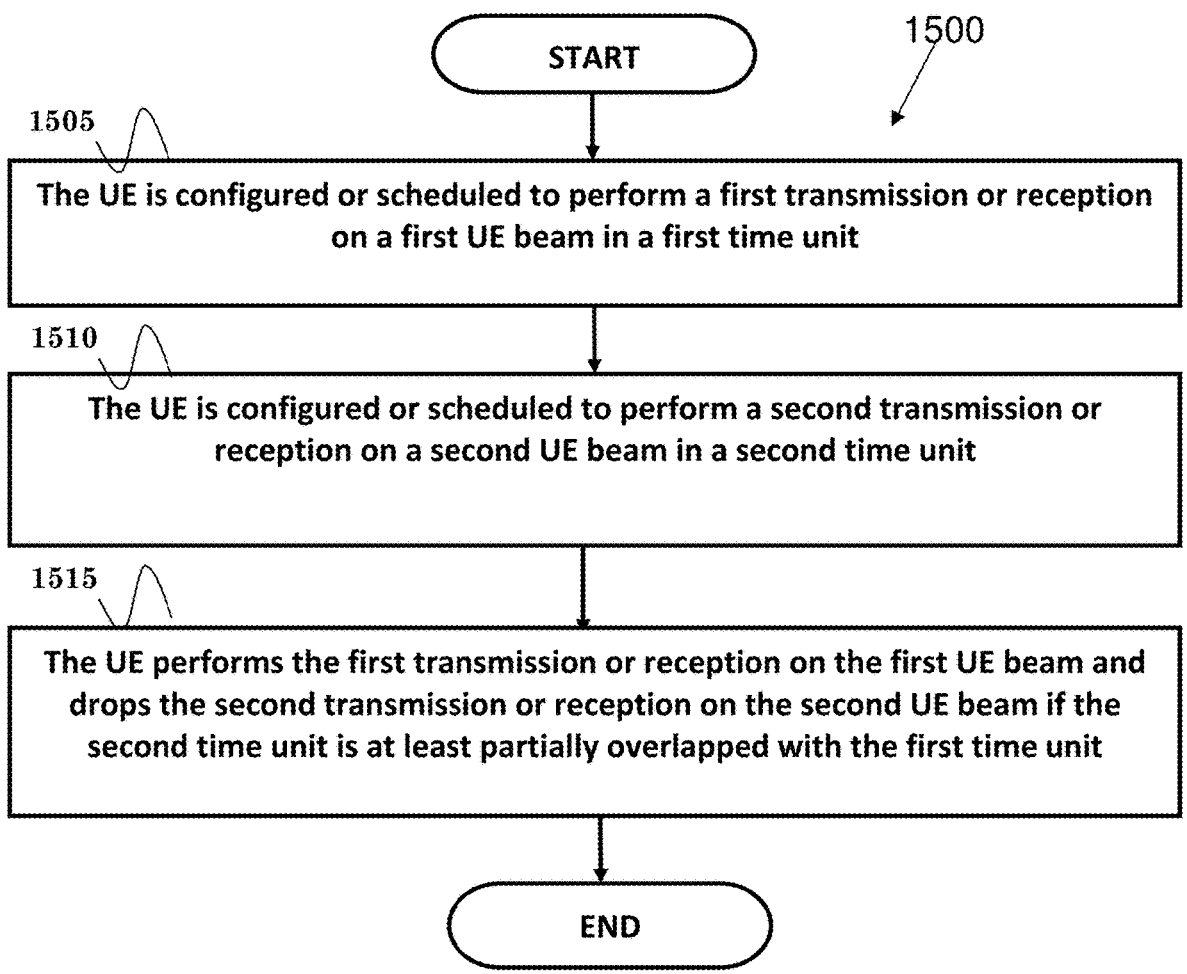
FIG. 15 is a flow diagram for another exemplary embodiment from the perspective of a UE.

FIG. 15 is a flow chart 1500 according to one exemplary embodiment from the perspective of a UE. In step 1505, the UE is configured or scheduled to perform a first transmission or reception on a first UE beam in a first time unit. In step 1510, the UE is configured or scheduled to perform a second transmission or reception on a second UE beam in a second time unit. In step 1515, the UE performs the first transmission or reception on the first UE beam and drops the second transmission or reception on the second UE beam if the second time unit is at least partially overlapped with the first time unit.

Figure 16:
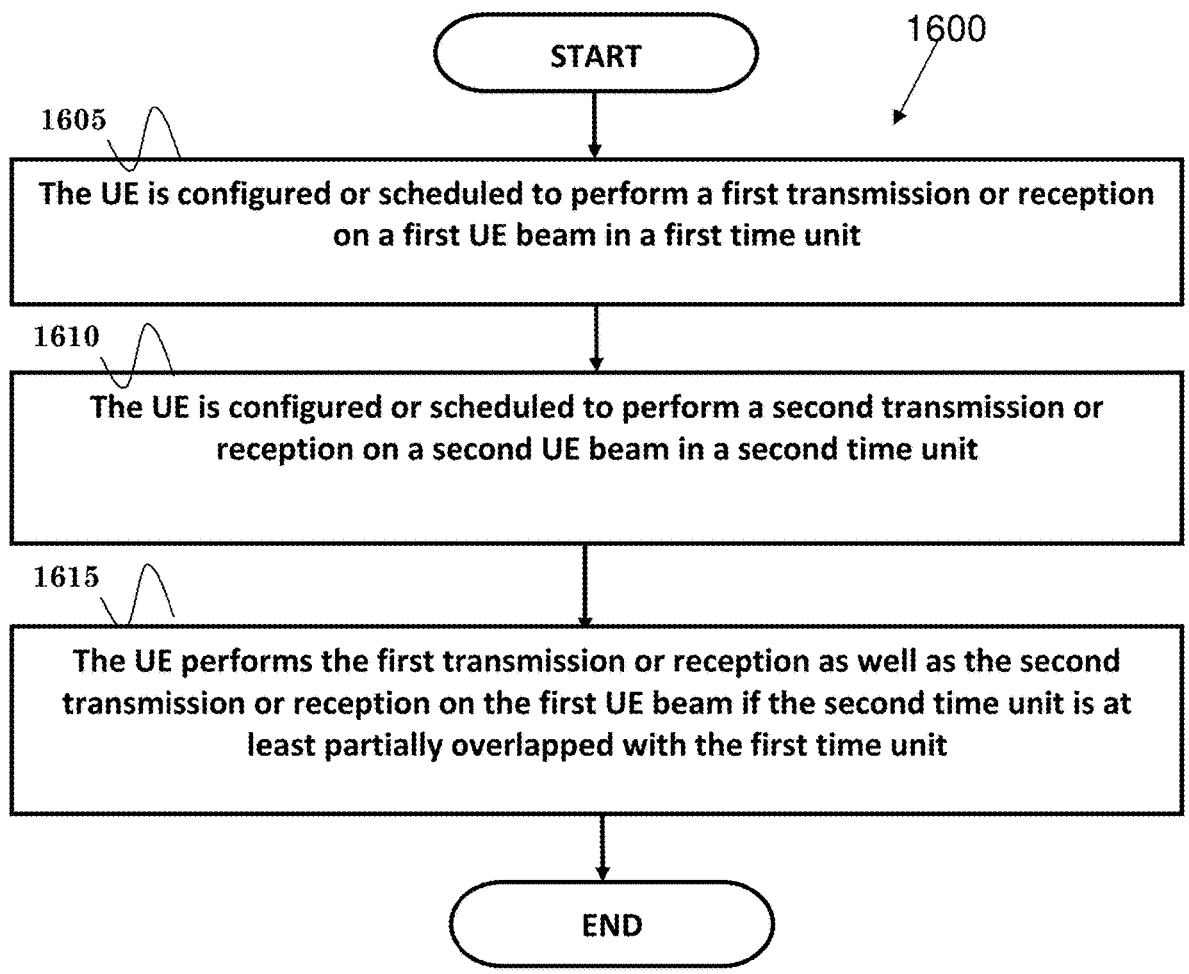
FIG. 16 is a flow diagram for another exemplary embodiment from the perspective of a UE.

FIG. 16 is a flow chart 1600 according to one exemplary embodiment from the perspective of a UE. In step 1605, the UE is configured or scheduled to perform a first transmission or reception on a first UE beam in a first time unit. In step 1610, the UE is configured or scheduled to perform a second transmission or reception on a second UE beam in a second time unit. In step 1615, the UE performs the first transmission or reception as well as the second transmission or reception on the first UE beam if the second time unit is at least partially overlapped with the first time unit.

In one embodiment, the second (UL) transmission or (DL) reception could be switched from the second UE beam to the first UE beam.

In one embodiment, the first (UL) transmission or (DL) reception and the second (UL) transmission or (DL) reception could be performed on different channels or different signals. The second (UL) transmission or (DL) reception on the first UE beam could be performed on the same channel or same signal when the second (UL) transmission or (DL) reception is performed on the second UE beam. Alternatively, the first (UL) transmission or (DL) reception and the second (UL) transmission or (DL) reception could be performed on the same channel or the same signal. The second (UL) transmission or (DL) reception could be performed on a channel or a signal of the first (UL) transmission or (DL) reception.

In one embodiment of the methods disclosed herein, the transmit power of the second (UL) transmission could be re-determined (by the UE) when the second (UL) transmission is switched from the second UE beam to the first UE beam.

In one embodiment of the methods disclosed herein, the first (UL) transmission or (DL) reception could be a data transmission or data reception, and the second (UL) transmission or (DL) reception may not be a data transmission or a data reception.

In one embodiment of the methods disclosed herein, the first (UL) transmission or (DL) reception could be a data transmission or a data reception, and the second (UL) transmission or (DL) reception could be any of HARQ-ACK or CSI.

In one embodiment of the methods disclosed herein, the first (UL) transmission or (DL) reception could be a signal for beam management, and the second (UL) transmission or (DL) reception may not be a signal for beam management.

In one embodiment of the methods disclosed herein, the first (UL) transmission or (DL) reception could be a signal for beam management, and the second (UL) transmission or (DL) reception could be any of SR, HARQ-ACK and CSI.

In one embodiment of the methods disclosed herein, the second (UL) transmission or (DL) reception does not include a data transmission or a data reception. The data transmission or reception cannot be switched from the second UE beam to the first UE beam.

In one embodiment of the methods disclosed herein, the second (UL) transmission or (DL) reception does not include a signal for beam management. The signal for beam management cannot be switched from the second UE beam to the first UE beam.

In one embodiment of the methods disclosed herein, the second (UL) transmission or (DL) reception does not include a signal for channel measurement. The signal for channel measurement cannot be switched from the second UE beam to the first UE beam.

In one embodiment of the methods disclosed herein, starting timing of the second (UL) transmission or (DL) reception could be later than starting timing of the first (UL) transmission or (DL) reception.

In one embodiment of the methods disclosed herein, the first (UL) transmission or (DL) reception and the second (UL) transmission or (DL) reception could be multiplexed on the same channel or the same signal. Alternatively, the first (UL) transmission or (DL) reception and the second (UL) transmission or (DL) reception could be bundled on the same channel or the same signal.

In one embodiment of the methods disclosed herein, the first (UL) transmission or (DL) reception could be a data transmission or a data reception, and the second (UL) transmission or (DL) reception may not be a data transmission or a data reception.

In one embodiment of the methods disclosed herein, the first (UL) transmission or (DL) reception could be a data transmission or a data reception, and the second (UL) transmission or (DL) reception could be any of HARQ-ACK or CSI.

In one embodiment of the methods disclosed herein, the first (UL) transmission or (DL) reception could be a signal for beam management, and the second (UL) transmission or (DL) reception may not be any of data, SR, HARQ-ACK, CSI, a signal for channel measurement, and a signal for beam management.

In one embodiment of the methods disclosed herein, the first (UL) transmission or (DL) reception could be a signal for channel measurement, and the second (UL) transmission or (DL) reception may not be any of data, SR, HARQ-ACK, CSI, a signal for channel measurement, and a signal for beam management.

In one embodiment of the methods disclosed herein, the second (UL) transmission or (DL) reception could have a lower priority than the first (UL) transmission or (DL) reception. The priority could be determined based on some factor(s) which include, but are not limited to, QoS, beam priority, channel quality of beam, channel type, signal type, and/or information type delivered in the (first and/or second) (UL) transmission or (DL) reception.

In one embodiment of the methods disclosed herein, a primary beam could have a higher priority than a secondary beam.

In one embodiment of the methods disclosed herein, a beam with better channel quality could have a higher priority than a beam with worse channel quality.

In one embodiment of the methods disclosed herein, a beam with the best channel quality could have a higher priority than other beams.

In one embodiment of the methods disclosed herein, a control channel could have a higher priority than a data channel.

In one embodiment of the methods disclosed herein, control information could have a higher priority than data (information).

In one embodiment of the methods disclosed herein, a scheduling request could have a higher priority than a HARQ-ACK.

In one embodiment of the methods disclosed herein, a HARQ-ACK could have a higher priority than CSI reporting.

In one embodiment of the methods disclosed herein, data, SR, HARQ-ACK, and CSI could have a higher priority than a signal for channel measurement.

In one embodiment of the methods disclosed herein, a signal for beam management could have a higher priority than a signal for channel measurement.

In one embodiment of the methods disclosed herein, a signal for beam management could have a higher priority than a signal for data (information).

In one embodiment of the methods disclosed herein, a signal for beam management could have a higher priority than a SR.

In one embodiment of the methods disclosed herein, a signal for beam management could have a higher priority than a HARQ-ACK.

In one embodiment of the methods disclosed herein, a signal for beam management could have a higher priority than CSI.

In one embodiment of the methods disclosed herein, the first time unit could be a slot or mini-slot. The second time unit could be a slot or mini-slot.

In one embodiment of the methods disclosed herein, the first (UL) transmission or (DL) reception could include any (or at least one) of data, SR, HARQ-ACK, CSI, a signal for channel measurement, and a signal for beam management.

In one embodiment of the methods disclosed herein, the second (UL) transmission or (DL) reception could include any (or at least one) of data, SR, HARQ-ACK, CSI, a signal for channel measurement, and a signal for beam management. Alternatively, the second (UL) transmission or (DL) reception could include at least one of SR, HARQ-ACK, and CSI.

In one embodiment of the methods disclosed herein, the UE is not capable of generating the first UE beam and the second UE beam simultaneously.

In one embodiment of the methods disclosed herein, the first (UL) transmission on the first UE beam and the second (UL) transmission on the second UE beam could be received via different TRPs.

In one embodiment of the methods disclosed herein, the first (UL) transmission on the first UE beam and the second (UL) transmission on the second UE beam could be received via different TRP beams.

In one embodiment of the methods disclosed herein, the first (DL) reception on the first UE beam and the second (DL) reception on the second UE beam could be transmitted via different TRPs.

In one embodiment of the methods disclosed herein, the first (DL) reception on the first UE beam and the second (DL) reception on the second UE beam could be transmitted via different TRP beams.

In one embodiment of the methods disclosed herein, the first (UL) transmission or (DL) reception on the first UE beam could be received or transmitted by or from a first TRP. The second (UL) transmission or (DL) reception on the second UE beam could be received or transmitted by or from a second TRP.

In one embodiment of the methods disclosed herein, the first (UL) transmission or (DL) reception on the first UE beam could be received or transmitted by or from a first TRP beam. The second (UL) transmission or (DL) reception on the second UE beam could be received or transmitted by or from a second TRP beam.

In one embodiment of the methods disclosed herein, the first transmission and/or the second transmission could be an uplink (UL) transmission transmitted from the UE to network.

In one embodiment of the methods disclosed herein, the first reception and/or the second reception could be a downlink (DL) transmission transmitted from network to the UE.

Referring back to FIGS. 3 and 4, in one embodiment, the device 300 includes a program code 312 stored in memory 310. The CPU 308 could execute program code 312 to enable the UE (i) to receive a first configuration or a first scheduling to request the UE to perform a first Uplink (UL) transmission on a first UE beam, wherein the first UL transmission is to be performed in a first time unit; (ii) to receive a second configuration or a second scheduling to request the UE to perform a second UL transmission on a second UE beam, wherein the second UL transmission is to be performed in a second time unit; and (iii) to perform the first UL transmission on the first UE beam and drop the second UL transmission on the second UE beam if the second time unit is at least partially overlapped with the first time unit.

In another embodiment, the CPU 308 could execute program code 312 to enable the UE (i) to receive a first configuration or a first scheduling to request the UE to perform a first Uplink (UL) transmission on a first UE beam, wherein the first UL transmission is to be performed in a first time unit; (ii) to receive a second configuration or a second scheduling to request the UE to perform a second UL transmission on a second UE beam, wherein the second UL transmission is to be performed in a second time unit; and (iii) to perform the first UL transmission and the second UL transmission on the first UE beam if the second time unit is at least partially overlapped with the first time unit.

In another embodiment, the CPU 308 could execute program code 312 to enable the UE (i) to be configured or scheduled to perform a first transmission or reception on a first UE beam in a first time unit; (ii) to be configured or scheduled to perform a second transmission or reception on a second UE beam in a second time unit; and (iii) to perform the first transmission or reception on the first UE beam and drop the second transmission or reception on the second UE beam if the second time unit is at least partially overlapped with the first time unit.

In another embodiment, the CPU 308 could execute program code 312 to enable the UE (i) to be configured or scheduled to perform a first transmission or reception on a first UE beam in a first time unit; (ii) to be configured or scheduled to perform a second transmission or reception on a second UE beam in a second time unit; and (iii) to perform the first transmission or reception as well as the second transmission or reception on the first UE beam if the second time unit is at least partially overlapped with the first time unit.

Furthermore, the CPU 308 can execute the program code 312 to perform all of the above-described actions and steps or others methods described herein.

Based on the invention, collision of multiple (UL) transmissions and/or (DL) receptions on multiple UE beams can be handled considering UE beamforming restriction.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a user equipment (UE) capable of performing UE beamforming, the method comprising:
   receiving, by the UE, a first configuration or a first scheduling to request the UE to perform a first Uplink (UL) transmission on a first UE beam in a cell, wherein the first UL transmission is to be performed in a first time unit;
   receiving, by the UE, a second configuration or a second scheduling to request the UE to perform a second UL transmission on a second UE beam in the cell, wherein the second UL transmission is to be performed in a second time unit; and
   performing, by the UE, the first UL transmission on the first UE beam in the cell and dropping the second UL transmission on the second UE beam if the second time unit is at least partially overlapped with the first time unit and the UE is not capable of generating the first UE beam and the second UE beam simultaneously.

2. The method of claim 1, wherein the second UL transmission has a lower priority than the first UL transmission, wherein the priority is determined based on at least one of Quality of Service (QoS), beam priority, channel quality of a beam, channel type, signal type, and information type delivered in the first UL transmission and the second UL transmission.

3. The method of claim 1, wherein the first UL transmission comprises at least one of data, Scheduling Request (SR), Hybrid Automatic Repeat Request Acknowledgement (HARQ-ACK), Channel State Information (CSI), a signal for channel measurement, or a signal for beam management.

4. The method of claim 1, wherein the second UL transmission comprises at least one of data, SR, HARQ-ACK, CSI, a signal for channel measurement, or a signal for beam management.

5. A method of a user equipment (UE) capable of performing UE beamforming, the method comprising:
   receiving, by a UE, a first configuration or a first scheduling to request the UE to perform a first Uplink (UL) transmission on a first UE beam in a cell, wherein the first UL transmission is to be performed in a first time unit;
   receiving, by the UE, a second configuration or a second scheduling to request the UE to perform a second UL transmission on a second UE beam in the cell, wherein the second UL transmission is to be performed in a second time unit; and
   performing, by the UE, the first UL transmission and the second UL transmission both on the first UE beam in the cell if the second time unit is at least partially overlapped with the first time unit and the UE is not capable of generating the first UE beam and the second UE beam simultaneously.

6. The method of claim 5, wherein the first UL transmission and the second UL transmission are performed on different channels or different signals.

7. The method of claim 5, wherein the UE re-determines a transmit power of the second UL transmission when the second UL transmission is switched from the second UE beam to the first UE beam.

8. The method of claim 5, wherein the first UL transmission and the second UL transmission are multiplexed or performed on a same channel or a same signal.

9. The method of claim 5, wherein the second UL transmission has a lower priority than the first UL transmission, wherein the priority is determined based on at least one of Quality of Service (QoS), beam priority, channel quality of beam, channel type, signal type, or information type delivered in the first UL transmission and the second UL transmission.

10. The method of claim 5, wherein the first UL transmission comprises at least one of data, Scheduling Request (SR), Hybrid Automatic Repeat Request Acknowledgement (HARQ-ACK), Channel State Information (CSI), a signal for channel measurement, or a signal for beam management.

11. The method of claim 5, wherein the second UL transmission comprises at least one of SR, HARQ-ACK, or CSI.

12. A User Equipment (UE), comprising:
   a control circuit;
   a processor installed in the control circuit; and
   a memory installed in the control circuit and coupled to the processor;
   wherein the processor is configured to execute a program code stored in the memory to:
      receive a first configuration or a first scheduling to request the UE to perform a first Uplink (UL) transmission on a first UE beam in a cell, wherein the first UL transmission is to be performed in a first time unit;
      receive a second configuration or a second scheduling to request the UE to perform a second UL transmission on a second UE beam in the cell, wherein the second UL transmission is to be performed in a second time unit; and perform the first UL transmission and the second UL transmission both on the first UE beam in the cell if the second time unit is at least partially overlapped with the first time unit and the UE is not capable of generating the first UE beam and the second UE beam simultaneously.

13. The UE of claim 12, wherein the second UL transmission has a lower priority than the first UL transmission, wherein the priority is determined based on at least one of Quality of Service (QoS), beam priority, channel quality of a beam, channel type, signal type, or information type delivered in the first UL transmission and the second UL transmission.

14. The UE of claim 12, wherein the first UL transmission comprises at least one of data, Scheduling Request (SR), Hybrid Automatic Repeat Request Acknowledgement (HARQ-ACK), Channel State Information (CSI), a signal for channel measurement, or a signal for beam management.

15. The UE of claim 12, wherein the second UL transmission comprises at least one of, SR, HARQ-ACK, or CSI.

16. The method of claim 12, wherein the first UL transmission and the second UL transmission are multiplexed or performed on a same channel or a same signal in the cell.

17. A method of a user equipment (UE) capable of performing UE beamforming, the method comprising:
receiving, by the UE, a first configuration or a first scheduling to request the UE to perform a first Downlink (DL) reception on a first UE beam in a cell, wherein the first DL reception is to be performed in a first time unit;

receiving, by the UE, a second configuration or a second scheduling to request the UE to perform a second DL reception on a second UE beam in the cell, wherein the second DL reception is to be performed in a second time unit; and performing, by the UE, the first DL reception on the first UE beam in the cell and dropping the second DL reception on the second UE beam if the second time unit is at least partially overlapped with the first time unit and the UE is not capable of generating the first UE beam and the second UE beam simultaneously.

18. The method of claim 17, wherein the second DL reception has a lower priority than the first DL reception, wherein the priority is determined based on at least one of Quality of Service (QoS), beam priority, channel quality of a beam, channel type, signal type, and information type delivered in the first UL transmission or the first DL reception and the second UL transmission or the second DL reception.

19. The method of claim 17, wherein the first DL reception comprises at least one of data, HARQ-ACK, a signal for channel measurement, or a signal for beam management.

20. The method of claim 17, wherein the second DL reception comprises at least one of data, HARQ-ACK, a signal for channel measurement, or a signal for beam management.

* * * * *